(12) United States Patent
Wang et al.

(10) Patent No.: US 11,494,416 B2
(45) Date of Patent: Nov. 8, 2022

(54) AUTOMATED EVENT PROCESSING SYSTEM

(71) Applicant: S&P Global Inc., New York, NY (US)

(72) Inventors: Chong Wang, Flushing, NY (US); Cesar Romero, North Brunswick, NJ (US); Antony Papadimitriou, New York, NY (US); Xiaomo Liu, Forest Hills, NY (US)

(73) Assignee: S&P Global Inc., New York, NY (US)

(*) Notice: Subject to any disclaimer, the term of this patent is extended or adjusted under 35 U.S.C. 154(b) by 0 days.

(21) Appl. No.: 16/939,821

(22) Filed: Jul. 27, 2020

(65) Prior Publication Data
US 2022/0027387 A1    Jan. 27, 2022

(51) Int. Cl.
| | |
|---|---|
| *G06F 16/242* | (2019.01) |
| *G06F 16/28* | (2019.01) |
| *G06F 16/2457* | (2019.01) |
| *G06F 16/29* | (2019.01) |
| *G06F 9/46* | (2006.01) |
| *G06Q 50/16* | (2012.01) |
| *G06Q 50/00* | (2012.01) |

(52) U.S. Cl.
CPC .......... *G06F 16/285* (2019.01); *G06F 9/466* (2013.01); *G06F 16/244* (2019.01); *G06F 16/24575* (2019.01); *G06F 16/29* (2019.01); *G06Q 50/01* (2013.01); *G06Q 50/163* (2013.01)

(58) Field of Classification Search
CPC .......... G06F 16/285; G06F 16/244; G06F 16/24575; G06F 16/29; G06F 9/466; G06F 16/2465; G06F 16/93; G06F 16/284; G06Q 50/01; G06Q 50/163; G07C 5/006

USPC .......................................................... 707/737
See application file for complete search history.

(56) References Cited

U.S. PATENT DOCUMENTS

| | | |
|---|---|---|
| 9,276,956 B2 | 3/2016 | Geng et al. |
| 9,785,699 B2 | 8/2017 | Gupta et al. |
| (Continued) | | |

FOREIGN PATENT DOCUMENTS

| | | |
|---|---|---|
| CA | 2727961 A1 | 12/2009 |

OTHER PUBLICATIONS

Office Action dated Feb. 15, 2022 regarding U.S. Appl. No. 16/779,305; 29 pages.

(Continued)

*Primary Examiner* — Kuen S Lu
(74) *Attorney, Agent, or Firm* — Yee & Associates, P.C.

(57) ABSTRACT

A method, apparatus, system, and computer program product for processing news items. A computer system receives news items from a network. The computer system identifies relevant news items in the news items based on events in the news items that relate an ability for set of operators to operate a set of properties. The computer system determines a context for the events in the relevant news items. The computer system clusters the relevant news items according to the events in the relevant news items into clusters based on the events such that the relevant news items about the same events are grouped together in the clusters. The same events are determined using the context for the events. The computer system matches the events in the clusters to transactions for the set of properties for the events to form matched transactions. The computer system performs actions for the matched transactions.

57 Claims, 11 Drawing Sheets

(56) References Cited

U.S. PATENT DOCUMENTS

| | | | |
|---|---|---|---|
| 10,083,230 B2 | 8/2018 | Wang et al. | |
| 10,235,452 B1 | 3/2019 | Savir et al. | |
| 10,496,691 B1 | 12/2019 | Chen et al. | |
| 11,244,115 B2 | 2/2022 | Xu et al. | |
| 11,334,949 B2 | 5/2022 | Kim et al. | |
| 11,393,036 B2 | 7/2022 | Wang et al. | |
| 2005/0060312 A1 | 3/2005 | Curtiss et al. | |
| 2007/0265928 A1* | 11/2007 | Fuchs | G06Q 30/06 705/26.1 |
| 2008/0208847 A1 | 8/2008 | Moerchen et al. | |
| 2008/0301175 A1* | 12/2008 | Applebaum | G06F 16/24565 707/999.102 |
| 2010/0106568 A1* | 4/2010 | Grimes | G06Q 30/0213 705/14.1 |
| 2012/0109966 A1 | 5/2012 | Liang et al. | |
| 2012/0207075 A1 | 8/2012 | Nagaraj et al. | |
| 2012/0254188 A1* | 10/2012 | Koperski | G06F 16/353 707/E17.089 |
| 2012/0284275 A1* | 11/2012 | Vadrevu | G06F 16/951 707/738 |
| 2014/0006403 A1 | 1/2014 | King et al. | |
| 2014/0164352 A1 | 6/2014 | Denninghoff | |
| 2015/0046442 A1 | 2/2015 | Bannur et al. | |
| 2016/0004764 A1 | 1/2016 | Chakerian et al. | |
| 2016/0004820 A1* | 1/2016 | Moore | H04W 4/21 705/3 |
| 2016/0092581 A1 | 3/2016 | Joshi et al. | |
| 2016/0098404 A1 | 4/2016 | Rubenczyk | |
| 2016/0188731 A1 | 6/2016 | Dai et al. | |
| 2016/0299989 A1 | 10/2016 | Trevisiol et al. | |
| 2018/0032997 A1* | 2/2018 | Gordon | G06Q 30/0269 |
| 2018/0067945 A1 | 3/2018 | Jain et al. | |
| 2018/0121555 A1 | 5/2018 | Li et al. | |
| 2018/0124194 A1 | 5/2018 | Rajewski | |
| 2018/0196808 A1 | 7/2018 | Ho | |
| 2018/0251230 A1 | 9/2018 | Chavez et al. | |
| 2018/0260484 A1 | 9/2018 | Wang | |
| 2019/0012374 A1 | 1/2019 | Petroni et al. | |
| 2019/0012387 A1* | 1/2019 | Li | G06Q 50/01 |
| 2019/0179861 A1 | 6/2019 | Goldenstein et al. | |
| 2019/0354800 A1 | 11/2019 | Yoo et al. | |
| 2020/0019870 A1 | 1/2020 | Stowell et al. | |
| 2020/0301997 A1 | 9/2020 | Smith et al. | |
| 2020/0401639 A1 | 12/2020 | Kussmaul et al. | |
| 2021/0034784 A1 | 2/2021 | Baughman et al. | |
| 2021/0109954 A1 | 4/2021 | Wang et al. | |
| 2021/0109968 A1 | 4/2021 | Kim et al. | |
| 2021/0110475 A1 | 4/2021 | Singh et al. | |
| 2021/0117867 A1 | 4/2021 | Clifton et al. | |
| 2022/0230253 A1 | 7/2022 | Kim et al. | |

OTHER PUBLICATIONS

Office Action dated Feb. 18, 2022 regarding U.S. Appl. No. 16/779,434; 21 pages.
Office Action dated Mar. 22, 2022 regarding U.S. Appl. No. 16/779,363; 88 pages.
Office Action dated Nov. 15, 2021 regarding U.S. Appl. No. 16/779,434; 18 pages.
Final Office Action dated Jan. 10, 2022 regarding U.S. Appl. No. 16/779,434; 19 pages.
Notice of Allowance dated Mar. 16, 2022 regarding U.S. Appl. No. 16/779,434; 7 pages.
Notice of Allowance dated Apr. 13, 2022, regarding U.S. Appl. No. 16/779,363; 8 pages.
Notice of Allowance dated Apr. 26, 2022, regarding U.S. Appl. No. 16/779,305; 11 pages.

* cited by examiner

AUTOMATED EVENT PROCESSING SYSTEM

CROSS-REFERENCE TO RELATED APPLICATION

This application is related to the following patent application: entitled "Deep Learning-Based Two-Phase Clustering Algorithm", Ser. No. 16/779,363; filed on Jan. 31, 2020, assigned to the same assignee, and incorporated herein by reference.

BACKGROUND INFORMATION

1. Field

The present disclosure relates generally to an improved computer system and, in particular, to a method, apparatus, computer system, and computer program product for automatically processing events in news items in a network data processing system.

2. Background

Commercial mortgage-backed securities (CMBSs) are fixed income investment products backed by mortgages on commercial properties rather than residential real estate. These types of securities are given ratings which can be in the form of classifications such as tranches based on quality or credit ratings. These ratings include a quantitative and qualitative analysis of underlying commercial real estate loans, properties backing the loans, security payment structure, and a legal review.

Disruptive events such as store closures, bankruptcies, extreme weather, massive unemployment, or industry crises can affect mortgage repayment capability for commercial mortgage-backed securities. These disruptive events can affect the rating of a commercial mortgage-backed security. Identifying and analyzing these events on the Internet can be a time-consuming and tedious process.

Therefore, it would be desirable to have a method and apparatus that take into account at least some of the issues discussed above, as well as other possible issues. For example, it would be desirable to have a method and apparatus that overcome a technical problem with identifying and processing events received in news items from the Internet.

SUMMARY

An embodiment of the present disclosure provides an information processing system comprising a computer system and a news information processor in the computer system. The news information processor is configured to receive news items from a network. The news information processor is configured to identify relevant news items in the news items based on events in the news items that relate an ability for a set of operators to operate a set of properties. The news information processor is configured to determine a context for the events in the relevant news items. The news information processor is configured to cluster the relevant news items according to the events in the relevant news items into a set of clusters based on the events such that the relevant news items about same events are grouped together in the set of clusters. The same events are determined using the context for the events. The news information processor is configured to match the events to transactions for the set of properties for the events in the set of clusters to form a set of matched transactions. The news information processor is configured to perform a number of actions for the set of matched transactions.

Another embodiment of the present disclosure provides an information processing system comprising a computer system and a news information processor in the computer system. The news information processor is configured to receive news items from a network. The news information processor is configured to identify relevant news items in the news items based on events in the news items that relate an ability for a set of properties to generate income. The news information processor is configured to determine a context for the events in the relevant news items. The news information processor is configured to cluster the relevant news items according to the events in the relevant news items into a set of clusters based on the events such that the relevant news items about same events are grouped together in the set of clusters, wherein the same events are determined using the context for the events. The news information processor is configured to match the events to transactions for the set of properties for the events in the set of clusters to form a set of matched transactions. The news information processor is configured to perform a number of actions for the set of matched transactions.

Still another embodiment of the present disclosure provides an information processing system comprising a computer system. A news ingestion layer in the computer system is configured to receive news items from a network. A relevance layer in the computer system is configured to identify relevant news items in the news items based on events in the news items that relate an ability for a set of operators to operate a set of properties. A contextualization layer in the computer system is configured to determine a context for the events in the relevant news items. A clustering layer in the computer system is configured to cluster the relevant news items according to the events in the relevant news items into a set of clusters based on the events such that the relevant news items about same events are grouped together in the set of clusters. The same events are determined using the context for the events. A transaction matching layer in the computer system is configured to match the events in the set of clusters to transactions for the set of properties for the events to form a set of matched transactions. An application layer in the computer system is configured to perform a number of actions for the set of matched transactions.

Yet another embodiment of the present disclosure provides a method for processing news items. A computer system receives the news items from a network. The computer system identifies relevant news items in the news items based on events in the news items that relate an ability for a set of operators to operate a set of properties. The computer system determines a context for the events in the relevant news items. The computer system clusters the relevant news items according to the events in the relevant news items into a set of clusters based on the events such that the relevant news items about the same events are grouped together in the set of clusters, wherein the same events are determined using the context for the events. The computer system matches the events in the set of clusters to transactions for the set of properties for the events to form a set of matched transactions. The computer system performs a number of actions for the set of matched transactions.

Still another embodiment of the present disclosure provides a computer program product for processing news items. The computer program product comprises a computer-readable storage media with first program code, second program code, third program code, fourth program code, fifth program code, and sixth program code stored on the computer-readable storage media. The first program code is executable by a computer system to cause the computer system to receive news items from a network. The second program code is executable by the computer system to cause the computer system to identify relevant news items in the news items based on events in the news items that relate an ability for a set of operators to operate a set of properties. The third program code is executable by the computer system to cause the computer system to determine a context for the events in the relevant news items. The fourth program code is executable by the computer system to cause the computer system to cluster the relevant news items according to the events in the relevant news items into a set of clusters based on the events such that relevant news items about the same events are grouped together in the set of clusters, wherein the same events are determined using the context for the events. The fifth program code is executable by the computer system to cause the computer system to match the events in the set of clusters to transactions for the set of properties for the events to form a set of matched transactions. The sixth program code is executable by the computer system to cause the computer system to perform a number of actions for the set of matched transactions.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
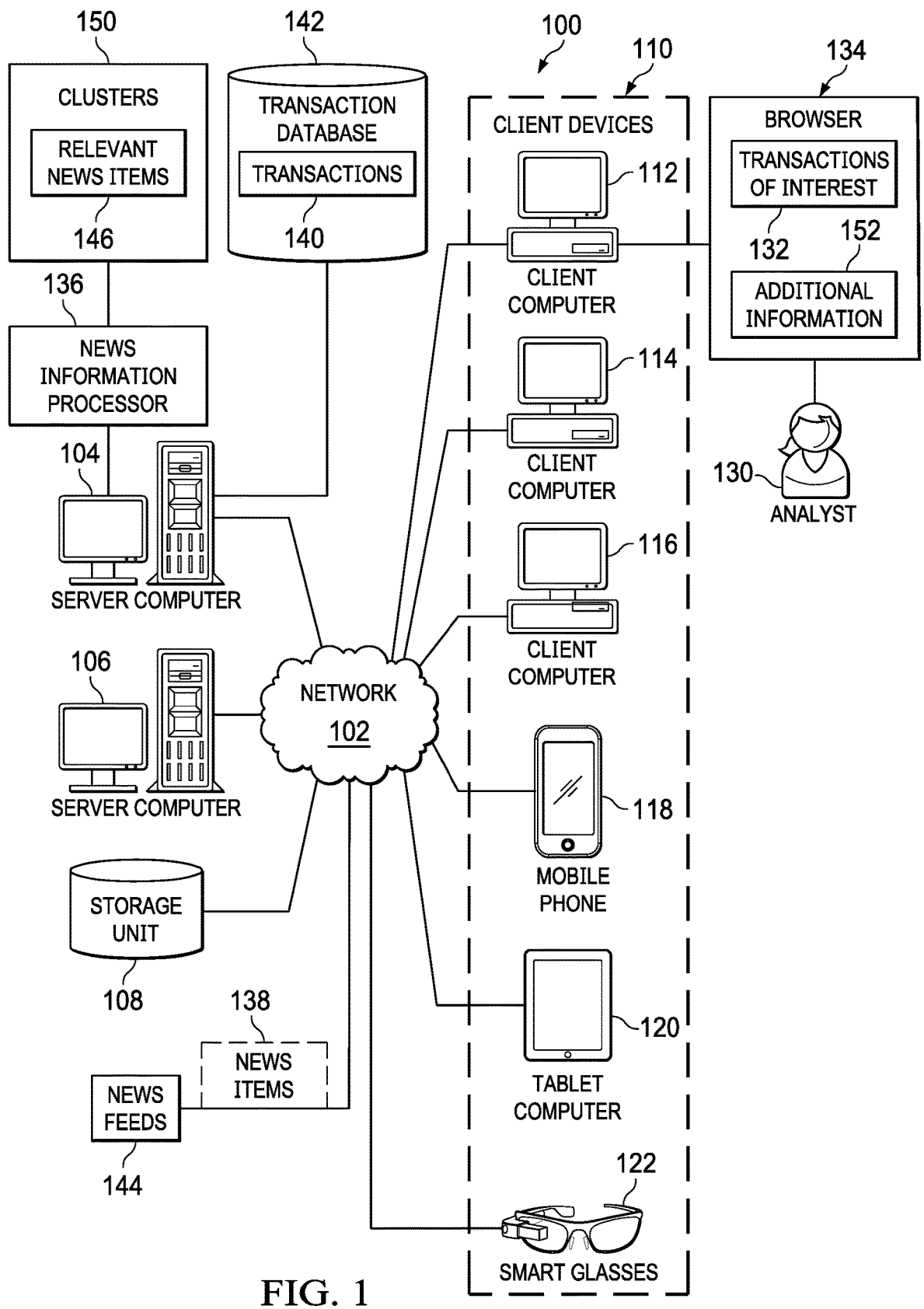
FIG. 1 is a pictorial representation of a network of data processing systems in which illustrative embodiments may be implemented.

The illustrative embodiments recognize and take into account one or more different considerations. For example, the illustrative embodiments recognize and take into account that current techniques involve users monitoring newsfeeds for multiple news alerts. The illustrative embodiments recognize and take into account that the current techniques can result in potentially missing important news containing events relating to the ability of an operator to operate a property.

Further, the illustrative embodiments recognize and take into account that significant time and effort is currently used to digest news articles. Those illustrative embodiments also recognize and take into account that the time and effort includes analyzing the impact of events and the importance of the events as well as whether these events affect transactions. The illustrative embodiments recognize and take into account that current techniques for collecting news items, identifying relevant news items, digesting content of the relevant news items, and identifying effective transactions are more time-consuming and tedious than desired.

Thus, the illustrative embodiments provide a method, apparatus, and system for processing news items. In one illustrative example, an information processing system comprises a computer system and a news information processor in the computer system. The news information processor is configured to receive the news items from a network. The news information processor is configured to identify relevant news items in the news items based on events in the news items that relate an ability for a set of properties to generate income. In one illustrative example, the ability of a set of properties to generate income involves an ability of the set of operators to operate the set of properties and a rent for the set of properties.

The news information processor is configured to determine a context for the events in the relevant news items. The news information processor is configured to cluster the relevant news items according to the events in the relevant news items into a set of clusters based on the events such that the relevant news items about same events are grouped together in the set of clusters, wherein the same events are determined using the context for the events. The news information processor is configured to match the events to transactions for the set of properties for the events in the set of clusters to form a set of matched transactions. The news information processor is configured to perform a number of actions for the set of matched transactions.

One or more illustrative examples provide an ability to analyze news items periodically such as on a daily basis. These news items can be analyzed to detect relevant news items based on events that can affect the ability of operators to operate a property. Further, the illustrative examples can also cluster news items for events as well as identify an importance of particular sources of the news items. The illustrative examples also can detect locations, such as places and addresses, and generate geolocations. Further, the illustrative examples also can detect exposure with respect to transactions.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

For example, analyst 130 can operate client computer 112 in client devices 110 to monitor a capability of tenants to pay rent on commercial properties that are subject to commercial mortgage-backed securities (CMBSs). This type of monitoring is performed by analyst 130 on a daily basis as part of a workflow performed by analyst 130. Based on the monitoring, analyst 130 may change a rating of one or more commercial mortgage-backed securities.

In this illustrative example, transactions of interest 132 can be displayed to analyst 130 in browser 134 on client computer 112. In this illustrative example, transactions of interest 132 are commercial mortgage-backed securities for which events have occurred that may affect an ability of tenants to operate a set of properties in particular commercial mortgage-backed securities. In turn, this ability to operate properties may affect the ability of the tenants to pay rent.

As depicted, browser 134 is a software application for accessing information on a network data processing system. Browser 134 can retrieve content from a server computer and display the information on client computer 112. In this illustrative example, browser 134 can be, for example, a web browser.

In this illustrative example, identification of transactions of interest 132 displayed in browser 134 is made by news information processor 136 in server computer 104. As depicted, news information processor 136 can analyze news items 138 to identify transactions of interest 132 from transactions 140 in transaction database 142.

In identifying transactions of interest 132, news information processor 136 receives news items 138 from news feeds 144 on network 102. In this illustrative example, news feeds 144 can be, for example, really simple syndication (RSS) news feeds. These types of sources are web feeds that can supply information in the form of news items 138. A news item can include a link to content and may also include information such as a title, a short description, and a publication date. The news item can be in a format such as extensible markup language (XML).

As depicted, news information processor 136 can identify relevant news items 146 in news items 138 based on events that affect an ability of tenants to operate properties in transactions 140. Further, news information processor 136 can place or group relevant news items 146 into clusters 150. Relevant news items 146 in a cluster refer to the same event. In other words, each cluster of relevant news items 146 can be for a particular event.

In the illustrative example, events in clusters 150 can then be matched to transactions 140 for a set of properties to identify transactions of interest 132. In this illustrative example, news information processor 136 sends transactions of interest 132 to browser 134 in client computer 112. In turn, browser 134 displays transactions of interest 132 to analyst 130. Additionally, additional information 152 may be displayed on browser 134 for use by analyst 130 in analyzing transactions of interest 132.

Additional information 152 can be, for example, relevant news items 146 in clusters 150 or other suitable information that may be used by analyst 130 to analyze transactions of interest 132. As another example, additional information 152 can be suggested rating changes for transactions of interest 132. These rating changes can be a change in a rating for at least one of a transaction or an entity making the transaction.

In this manner, analyst 130 can more quickly and easily determine whether the rating changes are needed for transactions of interest 132. Further, analyst 130 can perform a number of additional actions in addition to or in place of determining whether the rating changes are needed.

With news information processor 136 digesting news items 138, the tedious and time-consuming process of monitoring news items 138 from different sources by analyst 130 can be reduced or avoided. As a result, analyst 130 can focus on analyzing transactions of interest 132 to determine whether rating changes or other actions should be performed for those transactions.

The illustrative example for identifying transactions of interest 132 in network data processing system 100 is presented as one example in which news item processing can be performed to determine transactions of interest 132 and is not meant to limit the manner in which other illustrative examples can be implemented. For example, in other illustrative examples, news information processor 136 can be located in client computer 112. In yet other illustrative examples, transaction database 142 can be located in storage unit 108. In yet other illustrative examples, news information processor 136 can be a distributed process located in server computer 106 and client computer 112 in addition to or in place of server computer 104. In yet other illustrative examples, other analysts in addition to or in place of analyst 130 can operate other client devices in client devices 110 to analyze transactions of interest 132. For example, browsers may be located in at least one of mobile phone 118, tablet computer 120, or smart glasses 122 to display relevant ones of transactions of interest 132 and other information to analysts or other users. In still other illustrative examples, input by analyst 130 may be unnecessary. Instead, news information processor 136 can perform actions without needing analyst 130. For example, news information processor 136 may automatically make changes to credit ratings for transactions of interest 132.

Figure 2:
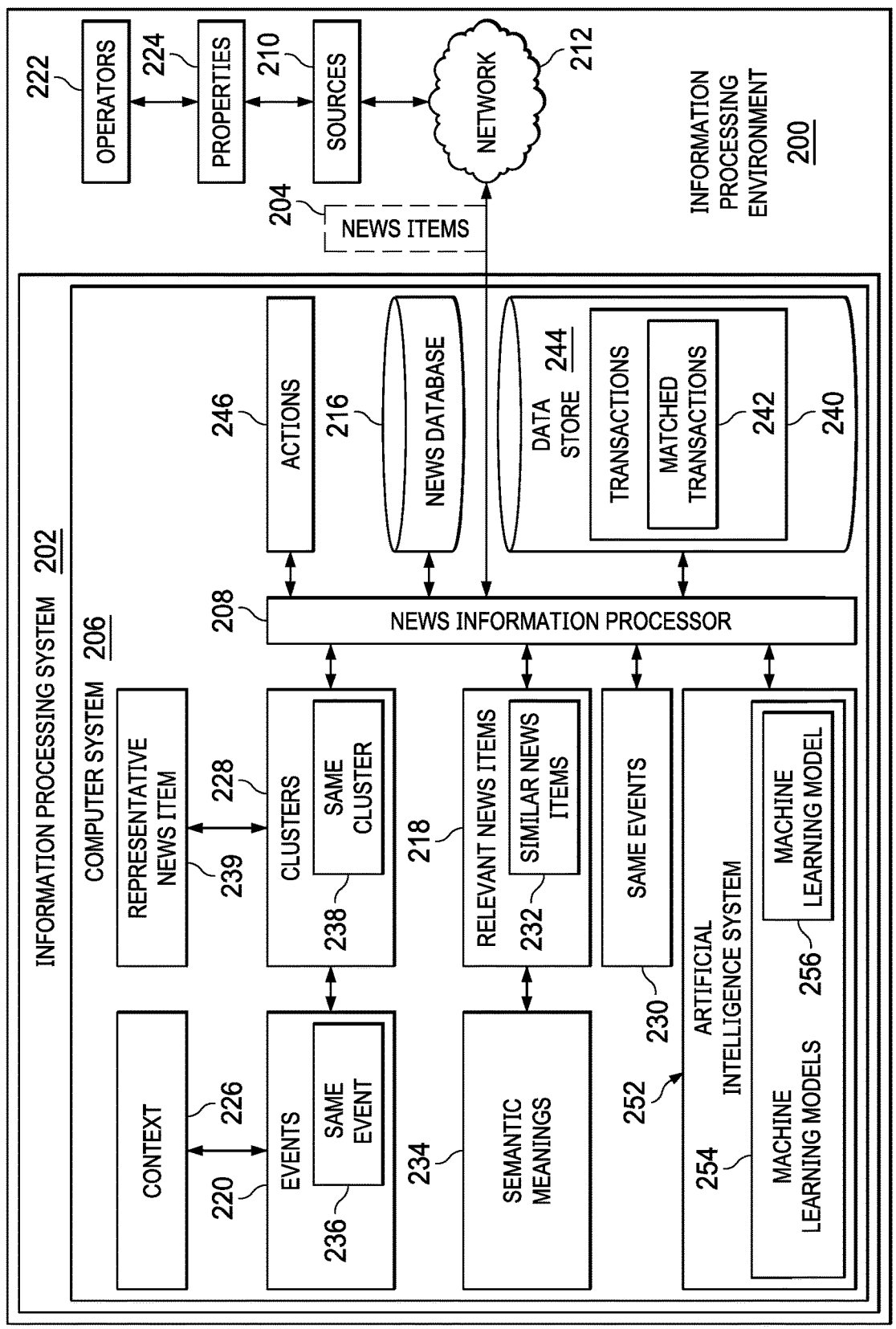
FIG. 2 is a block diagram of an information processing environment in accordance with an illustrative embodiment.

With reference now to FIG. 2, a block diagram of an information processing environment is depicted in accordance with an illustrative embodiment. In this illustrative example, information processing environment 200 includes components that can be implemented in hardware such as the hardware shown in network data processing system 100 in FIG. 1. Network data processing system 100 is an example of one implementation for information processing environment 200.

In this illustrative example, information processing system 202 in information processing environment 200 is configured to process news items 204. As depicted, news items 204 can take a number of different forms and can use a number of different types of media. For example, news items 204 are selected from at least one of a news article, a written news report, a video news story, a social media post, an audio news story, or some other suitable type of news item.

In this illustrative example, information processing system 202 is comprised of a number of components. As depicted, information processing system 202 is comprised of computer system 206 and news information processor 208. News information processor 208 is located in computer system 206.

News information processor 208 can be implemented in software, hardware, firmware, or a combination thereof. When software is used, the operations performed by news information processor 208 can be implemented in program code configured to run on hardware, such as a processor unit. When firmware is used, the operations performed by news information processor 208 can be implemented in program code and data and stored in persistent memory to run on a processor unit. When hardware is employed, the hardware may include circuits that operate to perform the operations in news information processor 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

As depicted, news information processor 208 in computer system 206 is configured to receive news items 204 from a number of sources 210 in network 212. As depicted, number of sources 210 can generate news items 204 containing information about at least one of operators 222 or properties 224. Operators 222 can be at least one of a tenant that pays rent, an owner of a property in properties 224, or some other organization or entity that uses or occupies a property in properties 224.

In this illustrative example, network 212 takes the form of the Internet. Network 102 in FIG. 1 is an example of an implementation for network 212.

As used herein, "a number of," when used with reference to items, means one or more items. For example, "a number of sources 210" is one or more of sources 210. The number of sources 210 can be selected from at least one of a really simple syndication (RSS) newsfeed or a wet aggregator website. The number of sources 210 can push news items 204 to news information processor 208, or news information processor 208 can pull news items 204, or news items can be both pushed and pulled.

In the illustrative example, news items 204 are received from a subscription to a set of news sources in sources 210 on network 212. The subscription can be based on topics of interest. For example, the topics of interest can be tenant news, weather news, economic news, or other topics. These topics of interest can be topics offered through the subscriptions. The subscriptions can be based on keywords for the topics of interest.

As depicted, news items 204 can be stored in news database 216. A database, such as news database 216, is a collection of data. Collected data can be stored in tables or other data structures and can be accessed using software such as a database management system.

In the illustrative example, news information processor 208 identifies relevant news items 218 in news items 204 based on events 220 in news items 204 that relate an ability for a set of operators 222 to operate a set of properties 224. In this illustrative example, the set of properties 224 is selected from at least one of a commercial property, a residential property, an industrial property, a natural resource producing property, or some other type of real property.

The identification of relevant news items 218 can be performed to identify news items 204 that have content about one or more of the set of operators 222. Additionally, relevant news items 218 can also be news items 204 that also include at least one of a weather type that relates to the ability of the set of operators 222 to operate the set of properties 224 or an economic condition in news items 204 that relates to the ability of the set of operators 222 to operate the set of properties 224. In this illustrative example, the news item can describe an event that decreases or increases the ability of an operator to operate a property.

News information processor 208 can also determine context 226 for events 220 in relevant news items 218. In the illustrative example, events 220 in news items 204 that relate the ability for the set of operators 222 to operate the set of properties 224 are selected from at least one of a store closing, a store opening, a bankruptcy, a weather condition, an earthquake, a hurricane, a flood, a wildfire, an economic condition, an unemployment event, an employment report, an industry crisis, or other events.

In other words, news information processor 208 can determine circumstances of events 220 in relevant news items 218. In the illustrative example, context 226 can enable comparing different ones of news items 204 in relevant news items 218 to each other to determine whether particular ones of news items 204 are for same events 230.

For example, different words may be used to describe the same event. For example, the term "store closing" for a tenant may be used in one news item. The term "cease operations" for the same tenant may be used in another news item. These two terms are for the same event that a store is closing a particular store. In determining context 226, a location of events 220 described in these news items may provide context 226 to determine whether these news items are about the same event.

In this illustrative example, news information processor 208 can cluster relevant news items 218 according to events 220 in relevant news items 218 into a set of clusters 228 based on events 220 such that relevant news items 218 about same events 230 are grouped together in a cluster in the set of clusters 228.

In this illustrative example, same events 230 are determined using context 226 for events 220. News information processor 208 can also perform clustering to group similar news items 232 in relevant news items 218 into the set of clusters 228 according to events 220 using context 226 and semantic meanings 234 for relevant news items 218.

In this illustrative example, a semantic meaning is the meaning of a news item. In other words, the words in the news item can be analyzed to determine the meaning of the news item. This analysis takes into account that different terms may have the same meaning. For example, "destination" and "last stop" are different words that have the same meaning.

The semantic meaning can be determined using semantic analysis processes such as natural language processing (NLP) to understand the meaning of a sentence according to the context of the sentence. As a result, similar news items 232 having context 226 and semantic meanings 234 for same event 236 in events 220 are in same cluster 238 in the set of clusters 228.

In the illustrative example, the clustering also may include placing relevant news items 218 into clusters 228 based on the set of operators 222 in addition to events 220. As a result, a cluster may contain relevant news items 218 for same event 236 for a set of operators 222. Further, the cluster may contain relevant news items 218 for same event 236 and a same tenant.

As depicted, news information processor 208 can also determine representative news item 239 for each cluster in the set of clusters 228. In the illustrative example, representative news item 239 is selected as a relevant news item that is most representative of relevant news items 218 for the event for a particular cluster. In other words, each cluster can represent an event and contain relevant news items 218 for that event.

Further, news information processor 208 can match events 220 in clusters 228 to transactions 240 for a set of properties 224 for events 220 to form a set of matched transactions 242. In other words, news information processor 208 can search for a transaction in transactions 240 that can be affected by events 220 in clusters 228.

In illustrative example, transactions 240 can be stored in data store 244. Data store 244 is a repository for persistently storing and managing collections of data such as databases, email messages, files, or other collections of data.

As depicted, transactions 240 are transactions for the set of properties 224. Transactions 240 can be, for example, selected from one of a commercial mortgage-backed security, a bond, a loan, a mortgage, an investment product, or other types of transactions relating to the set of properties 224.

In this illustrative example, news information processor 208 performs a number of actions 246 for the set of matched transactions 242. In performing the number of actions 246 for the set of matched transactions 242, news information processor 208 can perform at least one of determining a rating; determining a credit rating for a set of entities for the set of matched transactions 242; determining a rating for a commercial mortgage-backed security; sending an email message with news items and identifications of the set of matched transactions 242 potentially affected by events 220; or displaying the set of matched transactions 242 on a graphical user interface in a display system.

In this illustrative example, news information processor 208 can perform the different operations described using algorithms and processes implemented in news information processor 208. Additionally, news information processor 208 can also use artificial intelligence system 252 to perform one or more of the different processes described with respect to processing news items 204.

For example, artificial intelligence system 252 can be used by news information processor 208 to perform at least one of receiving news items 204 from network 212; identifying relevant news items 218 in news items 204 based on events 220 in news items 204 that relate the ability for the set of operators 222 to operate the set of properties 224; determining context 226 for events 220 in relevant news items 218; clustering relevant news items 218 according to events 220 in relevant news items 218 into the set of clusters 228 based on events 220 such that relevant news items 218 about same events 230 are grouped together in the set of clusters 228, wherein same events 230 are determined using context 226 for events 220; matching events 220 in the set of clusters 228 to transactions 240 for the set of properties 224 for events 220 to form a set of matched transactions 242; or performing the number of actions 246 for the set of matched transactions 242.

As depicted, artificial intelligence system 252 is a system that has intelligent behavior and can be based on the function of a human brain. Artificial intelligence system 252 comprises at least one of an artificial neural network, a cognitive system, a Bayesian network, a fuzzy logic, an expert system, a natural language system, or some other suitable system. Machine learning is used to train artificial intelligence system 252. Machine learning involves inputting data into a process and allowing the process to adjust and improve the function of artificial intelligence system 252.

In this illustrative example, artificial intelligence system 252 can include a set of machine learning models 254. As depicted, machine learning model 256 in machine learning models 254 is a type of artificial intelligence model that can learn without being explicitly programmed. Machine learning model 256 can learn based on training data input into machine learning model 256.

Machine learning model 256 can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models 254 include an artificial neural network, a decision tree, a support vector machine, a Bayesian network, a genetic algorithm, and other types of machine learning models. These machine learning models can be trained using data and process additional data to provide a desired output.

In one illustrative example, results of various operations performed by at least one of news information processor 208 or artificial intelligence system 252 can be used to train machine learning model 256. For example, news information processor 208 can train machine learning model 256 to determine relevant news items 218 based on clusters 228 of news items 204 generated when clustering relevant news items 218 according to events 220 in relevant news items 218. Clustering groups relevant news items 218 into the set of clusters 228 based on events 220 such that relevant news items 218 about a same event in same events 230 are grouped together in the set of clusters 228.

As depicted in this example, same events 230 are determined using context 226 for events 220. Further, semantic meanings 234 of relevant news items 218 can also be used in addition to or in place of context 226 for identifying same events 230.

In another illustrative example, news information processor 208 can train machine learning model 256 to identify relevant news items 218 based on events 220 in news items 204 that relate the ability for the set of operators 222 to operate the set of properties 224 using clusters 228 of news items 204 generated when clustering relevant news items 218 according to events 220 in relevant news items 218 into the set of clusters 228 based on events 220 such that relevant news items 218 about same events 230 are grouped together in the set of clusters 228.

In this illustrative example, same events 230 can be determined using context 226 for events 220. Further, semantic meanings 234 of relevant news items 218 can also be used in addition to or in place of context 226 for identifying same events 230.

Figure 3:
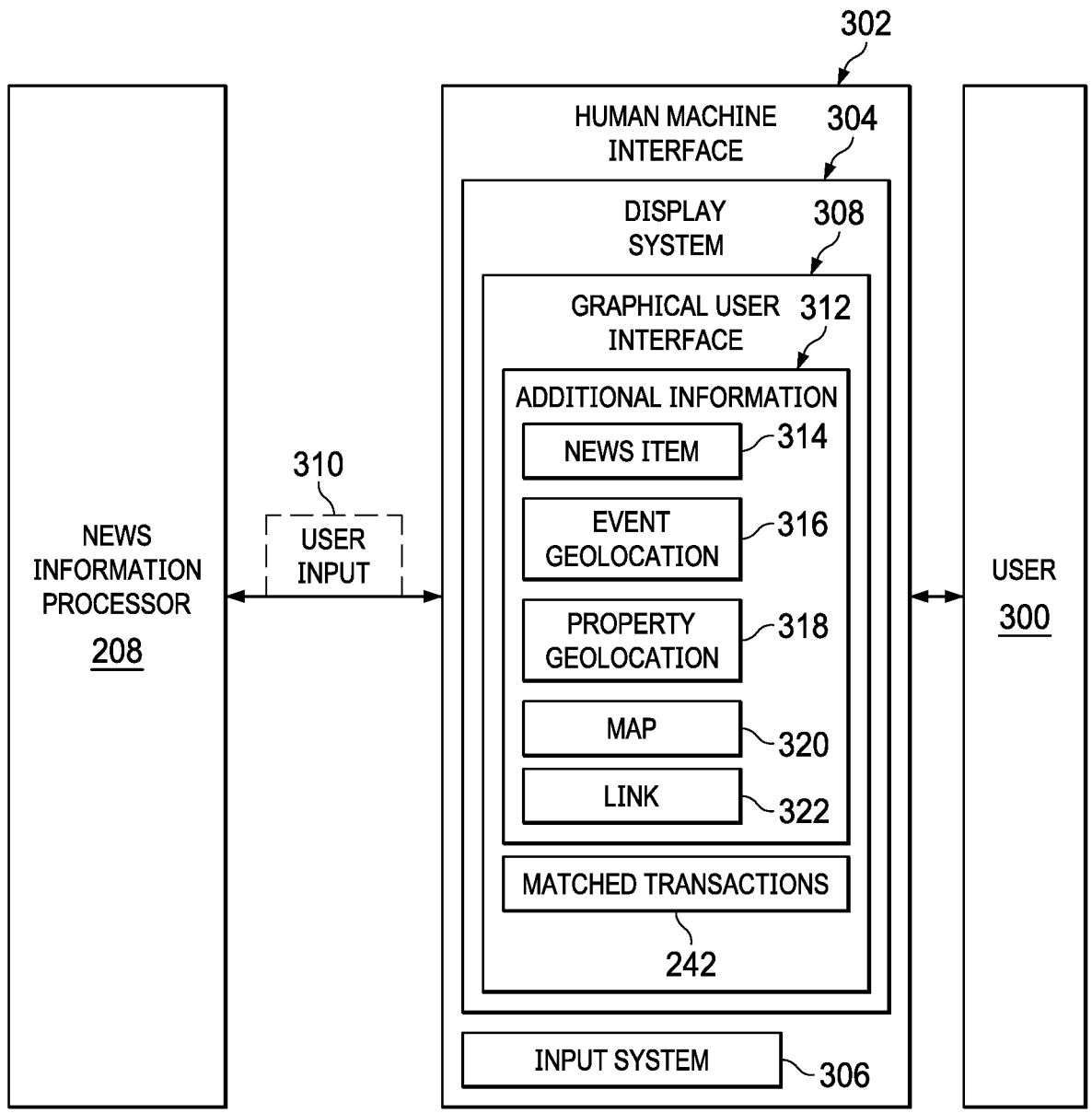
FIG. 3 is an illustration of an interface for interacting with an information processing system in accordance with an illustrative embodiment.

With reference next to FIG. 3, an illustration of an interface for interacting with an information processing system is depicted in accordance with an illustrative embodiment. In the illustrative examples, the same reference numeral may be used in more than one figure. This reuse of a reference numeral in different figures represents the same element in the different figures.

In this depicted example, user 300 can interact with news information processor 208 in information processing system 202 in FIG. 2 through human machine interface (HMI) 302, which comprises display system 304 and input system 306. Display system 304 is a physical hardware system and includes one or more display devices on which graphical user interface 308 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 300 is a person that can interact with graphical user interface 308 through user input 310 generated by input system 306 for computer system 206 in FIG. 2. Input system 306 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, graphical user interface 308 displays matched transactions 242 and additional information 312. In this illustrative example, additional information 312 is information that can be used to evaluate how events can affect matched transactions 242. As depicted, additional information 312 can be selected from at least one of news item 314 for a matched transaction, event geolocation 316 for an event, property geolocation 318, map 320, link 322 to news item 314, or other suitable information.

In this illustrative example, user input 310 can perform actions such as changing a rating, changing a credit rating for an entity in a matched transaction, changing the rating of a security in the matched transaction, selecting link 322 to view a news article, or some or some other suitable action. In the illustrative example, a title and a summary to at least one of relevant news items 218 or representative news item 239 in FIG. 2 for each event in a cluster can be displayed as part of additional information 342.

Figure 4:
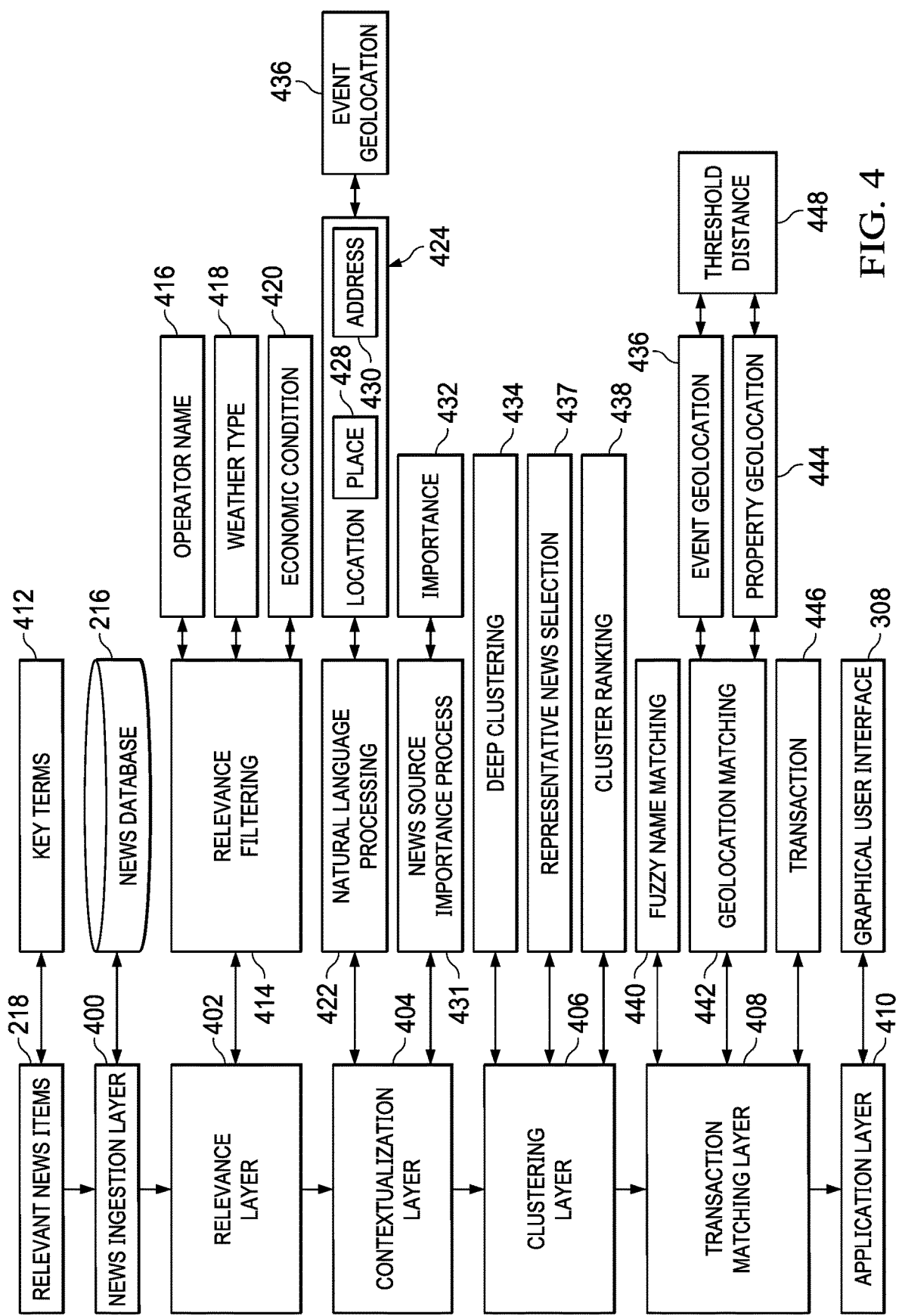
FIG. 4 is an illustration of an information news processor in accordance with an illustrative embodiment.

With reference next to FIG. 4, an illustration of an information news processor is depicted in accordance with an illustrative embodiment. This figure depicts one implementation for news information processor 208 in FIG. 2. As depicted, news information processor 208 comprises news ingestion layer 400, relevance layer 402, contextualization layer 404, clustering layer 406, transaction matching layer 408, and application layer 410.

In this illustrative example, news ingestion layer 400 is configured to receive news items 204 from network 212 in FIG. 2. As depicted, news ingestion layer 400 can store news items 204 in news database 216 for processing.

News items 204 in FIG. 2 can be received on a subscription basis. For example, a subscription can be made to one or more of really simple syndication (RSS) feeds. These subscriptions for receiving news items 204 can be based on key terms 412. For example, key terms 412 can be tenant key terms such as "store closing", "chain closing", or some other set of key terms. As another example, key terms 412 can be weather key terms such as "National Weather Service", "NWS", or other suitable key terms relating to weather.

Other key terms that can be used include, for example, economic key terms. In this example, the economic key terms can be "layoffs", "interest-rate change", "jobless disclaims", "payroll reports", and other types of economic key terms.

As depicted, relevance layer 402 is configured to identify relevant news items 218 in news items 204 based on events 220 in news items 204 that relate an ability for a set of properties 224 to generate revenue. For example, events 220 in news items 204 can relate to a set of operators 222 in FIG. 2 to operate the set of properties 224.

The identification of relevant news items 218 by relevance layer 402 can be performed using relevance filtering 414. In this illustrative example, relevance filtering 414 can include or remove news items 204 that do not relate to the ability of the set of operators 222 to operate the set of properties 224. As depicted, relevance filtering 414 can be performed on both text and metadata for news items 204.

In this example, relevance filtering 414 removes news items 204 that do not include operator name 416 for the set of operators 222. In addition to performing relevance filtering 414 for operator name 416, relevance filtering 414 is also performed using at least one of weather type 418 that relates to an ability of an operator to operate a property, economic condition 420 that relates to the ability of an operator to operate a property, or other types of news that can affect the ability of a property to generate revenue or income.

As depicted, relevance filtering 414 may require particular key terms for at least one of weather type 418 or economic condition 420 to be in a title or a sentence in news items 204. News items 204 that do not include the particular key terms are removed or filtered out of news items 204. The remaining news items are relevant news items 218.

In other words, news items 204 that contain operator name 416 are included. In this example, news items 204 that do not contain operator name 416 are excluded. For example, for detecting operator name 416, named entity recognition (NER) may be implemented to identify a mention of operator name 416 in unstructured text in news items 204.

The remaining news items in news items 204 can be filtered based on at least one of weather type 418 or economic condition 420 in this illustrative example.

For example, the remaining news items including operator name 416 can be filtered using a keyword match process to include relevant weather types. These relevant weather types can include, for example, at least one of a hurricane, a tornado, a tsunami, a tidal wave, a flood, an avalanche, a wildfire, a fire, volcanic activity, an earthquake, a landslide, or other types of weather that are considered relevant to the ability of a property to generate revenue.

Further, the remaining news items including operator name 416 can be filtered using a keyword match to determine whether these news items include relevant economic conditions such as jobless claims, payroll reports, layoffs, a jobs report, an interest-rate change, durable goods orders, or other suitable types of news items that relate to economic conditions that affect the ability of a property to generate revenue.

In this illustrative example, contextualization layer 404 is configured to determine context 226 for events 220 in FIG. 2 in relevant news items 218. In this illustrative example, contextualization layer 404 can determine context 226 using natural language processing 422. Further, in this illustrative example, contextualization layer 404 can use natural language processing 422 to determine location 424 of an event. In this illustrative example, location 424 can be at least one of place 428 or address 430.

In this illustrative example, place 428 is an area. The area can be a geographic area such as a state, a county, a city, a township, or some other region. For example, place 428 can be Florida, Columbus, or some other place. With natural language processing 422, different forms and abbreviations for places can be identified in news items 204.

Place 428 can also be, for example, address 430. Natural language processing 422 can include processes to parse patterns such as street patterns and city and state patterns. Natural language processing 422 can be configured to determine different forms and patterns for address 430. The accuracy of place 428 in address detection can be enhanced using machine learning models 254 in artificial intelligence system 252 in FIG. 2.

In determining location 424, at least one of place 428 or address 430 can be described using event geolocation 436. In this illustrative example, event geolocation 436 can be a single coordinate for address 430. When describing place 428, event geolocation 436 can be a plurality of coordinates defining an area of place 428.

Additionally, contextualization layer 404 can use news source importance process 431 to identify importance 432 of news items 204. For example, contextualization layer 404 can use natural language processing 422 to identify different sources of news items 204. Contextualization layer 404 can identify more credible sources. Key phrases such as names of known credible new sources can be used. Further, contextualization layer 404 can also determine credibility of a source based on a number of links to a website for a particular news source from other web sites. As another example, importance 432 can be based on traffic monitored by various traffic monitoring systems.

Thus, contextualization layer 404 can determine at least one of importance 432 of a source of a news item or location 424 of an event. Further, contextualization layer 404 can also use natural language processing 422 to determine semantic meanings 234 for news items 204 in FIG. 2.

As depicted, clustering layer 406 is configured to cluster relevant news items 218 according to events 220 in relevant news items 218 into a set of clusters 228 based on events 220 such that relevant news items 218 about same events 230 are grouped together in the set of clusters 228. In this illustrative example, same events 230 are determined using context 226 for events 220. Further, semantic meanings 234 in FIG. 2 of relevant news items 218 can also be used in addition to or in place of context 226 for identifying same events 230.

As depicted, clustering layer 406 can use machine learning models 254 in artificial intelligence system 252 to group news items 204 in FIG. 2. In this illustrative example, news items 204 about same events 230 should be grouped together. This type of grouping performs deduplication. Further, a cluster size indicated by a number of news items 204 can also indicate an importance of a particular event. Further, each cluster can also be for a single tenant or other operator of a property in transactions 240 in FIG. 2.

In the illustrative example, deep clustering 434 is used in clustering layer 406 to create clusters 228 in FIG. 2. In this illustrative example, deep clustering 434 is a process that can be performed using a two-phase clustering algorithm. Named entities are first extracted from each relevant news item using a statistical model. Each relevant news item can be represented by a one-hot vector built based on named entities in the relevant news item. In natural language processing 422, a one-hot vector is a 1×N matrix.

Distances of pairwise relevant news items can be computed based on cosine distance. Two relevant news items are grouped together if a distance of these two relevant news items is not more than a threshold. A representative news item can be selected for each cluster based on a news publication date and news source significance. The initial set of clusters is then merged based on the representative news. A deep contextualized word representation model, such as ELMo, can be used to identify the representative news item for each cluster.

In this illustrative example, clustering layer 406 uses representative news selection 437 to select representative news item 239 in FIG. 2 for each cluster. Selection of representative news item 239 from a group of relevant news items 218 about a same event in a cluster can be based on a ranking system. The ranking system can be based on a combination of factors for each relevant news item in the cluster. The combination of factors can be, for example, a presence of a relevant entity, a number of properties for that entity being referenced, and the importance of the source of that relevant news item.

In this illustrative example, clustering layer 406 can also perform cluster ranking 438 of clusters 228 in FIG. 2. Cluster ranking 438 can operate to rank clusters 228 based on different parameters. For example, clusters 228 may be ranked based on weather or an operator as factors. With ranking clusters based on weather, the ranking can be based on at least one of a severity level, a fatality, property damage, a National Weather Service (NWS) risk, or other factors. If clusters 228 are ranked based on a tenant, the ranking can be based on at least one of whether an operator name is in the news item, a number of stores impacted, a cluster size, news source importance, or other suitable factors.

In the illustrative example, transaction matching layer 408 is configured to match events 220 in the set of clusters 228 to transactions 240 for the set of properties 224 for events 220 to form a set of matched transactions 242 in FIG. 2. In this illustrative example, the matching of events 220 in the set of clusters 228 to transactions 240 can be performed by matching all of relevant news items 218 or by using representative news item 239 in FIG. 2 for each of clusters 228.

In this illustrative example, transaction matching layer 408 can use fuzzy name matching 440 to match operator names in relevant news items 218 to transactions 240. In this illustrative example, fuzzy name matching 440 can use a fuzzy matching technique that works with names that may be less than a 100 percent correspondence.

Additionally, transaction matching layer 408 can compare property geolocation 444 for transaction 446 to event geolocation 436 of an event. In this illustrative example, event geolocation 436 is determined by relevance filtering 414 using natural language processing 422.

Event geolocation 436 can be for an event relating to a tenant, a weather type, or an economic condition. In this example, transaction matching layer 408 can use geolocation matching 442 to determine whether an event in a set of clusters 228 matches transaction 446 when event geolocation 426 is within threshold distance 448 of property geolocation 444. In other words, threshold distance 448 can be used to determine how close a match is needed between event geolocation 436 and property geolocation 444.

In other words, when event geolocation 436 is for an address, property geolocation 444 does not have to be an exact match. If the difference between the coordinates is, for example, 10 feet, 75 feet, 100 yards, one mile, or some other selected distance, a match is present between the event and transaction 446. In a similar fashion, if the event is a weather type or an economic condition, property geolocation 444 does not have to be exactly within the area defined by the coordinates in event geolocation 426 to have a match. For example, threshold distance 448 can define how far outside property geolocation 444 can be from the area defined by the coordinates in event geolocation 426. The threshold can require that property geolocation 444 is within the area defined for the same distance of the area.

As depicted, application layer 410 is configured to perform a number of actions 246 in FIG. 2 for the matched transactions. For example, application layer 410 displays the matched transactions on graphical user interface 308 to a user for review. Other actions such as sending alerts or notices by email, suggesting a rating change, selling a transaction, or some other suitable action can be performed by application layer 410.

The illustration of the different layers are presented as an example of one manner in which news information processor 208 in FIG. 2 can be implemented. Other illustrative examples may include additional layers or omit some layers. For example, ranking can be performed in a separate layer from clustering. In some illustrative examples, a ranking feature may be omitted. As another illustrative example, some or all of the layers may be implemented using machine learning models 254 in artificial intelligence system 252 in FIG. 2. Further, results from identifying relevant news items 218 and creating clusters 228 can be used as training data to train one or more of machine learning models 254 for use in performing these steps.

In one illustrative example, one or more technical solutions are present that overcome a technical problem with identifying and processing events 220 received in news items 204 from the Internet. As a result, one or more technical solutions may provide a technical effect of providing automated processing of news items 204 to identify transactions 240 that are of interest with respect to an ability of one or more of properties 224 subject to transactions 240 to generate income. In the illustrative examples, news items 204 can be processed to determine an effect of events 220 on the ability of a set of operators 222 to operate a set of properties 224. The ability to operate the set of properties 224 affects the ability of the set of operators 222 to generate income and pay rent or make mortgage payments for the set of properties 224, which is one manner in which the ability of the set of properties 224 can be affected.

One or more technical solutions are provided in the illustrative example that enables generating alerts or displaying information regarding transactions 240 that have been matched to events 220 in relevant news items 218. In this manner, a user can make decisions such as whether a rating of an entity in a transaction or the rating of the transaction itself should change. In other words, a credit rating of an entity or the rating of the transaction can be affected by events 220 in relevant news items 218.

Computer system 206 can be configured to perform at least one of the steps, operations, or actions described in the different illustrative examples using software, hardware, firmware, or a combination thereof. As a result, computer system 206 operates as a special purpose computer system in which news information processor 208 in computer system 206 enables enhanced processing of news items 204 to generate matched transactions 242. In particular, news information processor 208 transforms computer system 206 into a special purpose computer system as compared to currently available general computer systems that do not have news information processor 208.

In the illustrative example, the use of news information processor 208 in computer system 206 integrates processes into a practical application for a method for processing news items that increases the performance of computer system 206 and identifies transactions of interest compared to currently used techniques for analyzing news items 204 and identifying transactions 240. In other words, news information processor 208 in computer system 206 is directed to a practical application of processes integrated into news information processor 208 in computer system 206 that processes news items 204 to identify transactions of interest for analysis. Further, news information processor 208 can suggest rating changes or other actions based on the identification of transactions using news items 204.

In this illustrative example, news information processor 208 in computer system 206 identifies relevant news items, identifies at least one of context 226 or semantic meanings 234 for relevant news items 218, and clusters news items 204 based on relevant events in relevant news items 218. Events 220 are matched to transactions 240 based on locations and actions are performed by news information processor 208 in computer system 206. In this manner, news information processor 208 in computer system 206 provides a practical application for processing news items 204 received from the Internet such that map information generated for review is reduced. Further, news information processor 208 in computer system 206 provides a graphical tool in which graphical user interface 308 in human machine interface 302 is controlled by news information processor 208 to display matched transactions 242 and additional information 312. In this manner, news information processor 208 in computer system 206 provides a visualization of matched transactions 242 and additional information 312 in a manner that reduces effort needed by a user to review and analyze an effect of events 220 on transactions of interest 132 identified from news items 204. For example, visualization in graphical user interface 308 can include at least one of map 320, link 322, or other information. For example, representative news item 239 for each event matched to a transaction can be displayed in graphical user interface 308.

The illustrations of information processing environment 200 and the different components in this environment in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, artificial intelligence system 252 is shown as a separate component from news information processor 208. In some illustrative examples, artificial intelligence system 252 may be a part of news information processor 208 instead of a separate component as depicted in this example. In yet another illustrative example, events 220 may be events that affect the ability of a property to generate revenues rather than the ability of an operator to generate revenues. The different illustrative examples can apply to the ability of a property to generate revenues when a property is, for example, a residential property or a natural resource producing property.

Figure 5:
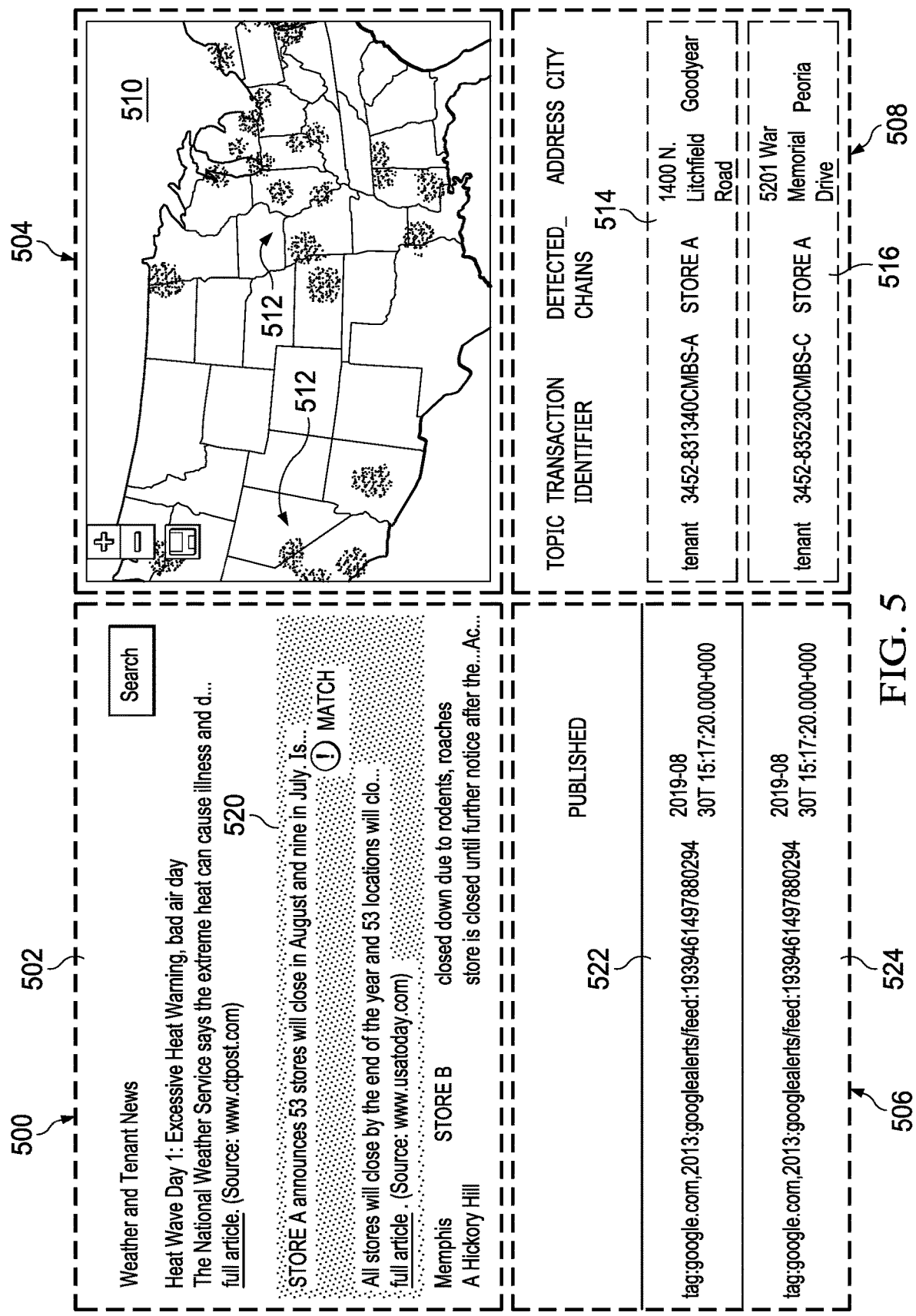
FIG. 5 is an illustration of a graphical user interface in accordance with an illustrative embodiment.

Turning next FIG. 5, an illustration of a graphical user interface is depicted in accordance with an illustrative embodiment. As depicted, graphical user interface 500 is an example of one implementation of graphical user interface 308 as shown in block form in FIG. 3.

In this illustrative example, graphical user interface 500 is a graphical tool that provides a visualization of information to a user. Graphical user interface 500 displays information about transactions of interest such that a user can perform actions such as at least one of reading relevant news items, analyzing events in the relevant news items, determining risk changes to transactions, considering potential rating changes to transactions or entities in the transactions, or other suitable actions.

In this illustrative example, graphical user interface 500 displays a number of different sections. As depicted, graphical user interface 500 displays news item section 502, map section 504, link section 506, and transaction section 508.

As depicted, news item section 502 displays summaries of news items for events. Link section 506 displays links for the news items. Map section 504 displays map 510 and displays graphical indicators 512 on map 510 that identify locations of the events for relevant news items that have been matched to transactions.

In this illustrative example, selecting a news item in news item section 502 results in transactions related to the selected news item being displayed in transaction section 508. As depicted, each news item in news item section 502 is a summary of a representative news item in a cluster of news items for a particular event. Selection of the news item in news item section 502 results in links being displayed for the news items for an event in a cluster together in link section 506. Further, selection of the news item in news item section 502 also results in transactions matched to the events in the news item being displayed in transaction section 508.

As depicted, transaction section 508 includes information about matched transactions based on the news items in a form of news articles that have been assessed by news information processor 208 in FIG. 2. In this example, transaction 514 and transaction 516 are displayed in transaction section 508. Each of these transactions include a transaction identifier, a tenant name, and an address for a particular location. These two transactions are examples of transactions subject to an event such as highlighted news item 520 in news item section 502. In this example, highlighted news item 520 provides a summary of the news item related to transaction 514 and transaction 516. In this illustrative example, highlighted news item 520 is a summary of a representative news item in a cluster of news items relating to an event about store closures for Store A in transaction 514 and transaction 516.

Link 522 and link 524 are links to news items relating to transaction 514 and transaction 516. Selection of these links results in a display of the news items relating to transaction 514 and transaction 516.

The illustration of graphical user interface 500 is provided as one example in which graphical user interface 308 shown in block form in FIG. 3 can be implemented to provide visualizations of information to user 300. This example is not meant to limit the manner in which other illustrative examples can be implemented. For example, some of the displayed sections can be omitted and other sections can be included in other graphical user interfaces providing implementations for graphical user interface 308. For example, map section 504 can be omitted. In another illustrative example, a rating section can be included in graphical user interface 500 in which at least one of a current rating, a modification to a rating, or other information about ratings can be displayed.

Further, in other illustrative examples, the interaction with graphical user interface 500 can include other steps in addition to or in place of the ones described above. For example, a transaction can be selected from transaction section 508 resulting in a corresponding representative news item containing events relating to the transaction being displayed in news item section 502 along with links for the news items for that event relating to the transaction.

As another example, a graphical indicator in graphical indicators 512 can be selected to display the represented news item in news item section 502 for the event at the location associated with the selected graphical indicator. Further, links for these news items relating to the event at the selected location can be displayed in link section 506. Transactions for properties affected by the event in these locations at the selected link can be displayed in transaction section 508.

In this manner, graphical user interface 500 provides a graphical tool that provides a visualization of information in a manner that is more than merely listing articles and transactions. These different features can provide a user an ability to easily and quickly visualize news about events that may affect the ability of an operator to operate a property that is subject to a transaction. Further, time and effort needed by the user to review articles for events of interest and determine whether the events of interest relate to properties subject to transactions can be avoided by the user through automated processing of news items by news information processor 208.

Figure 6:
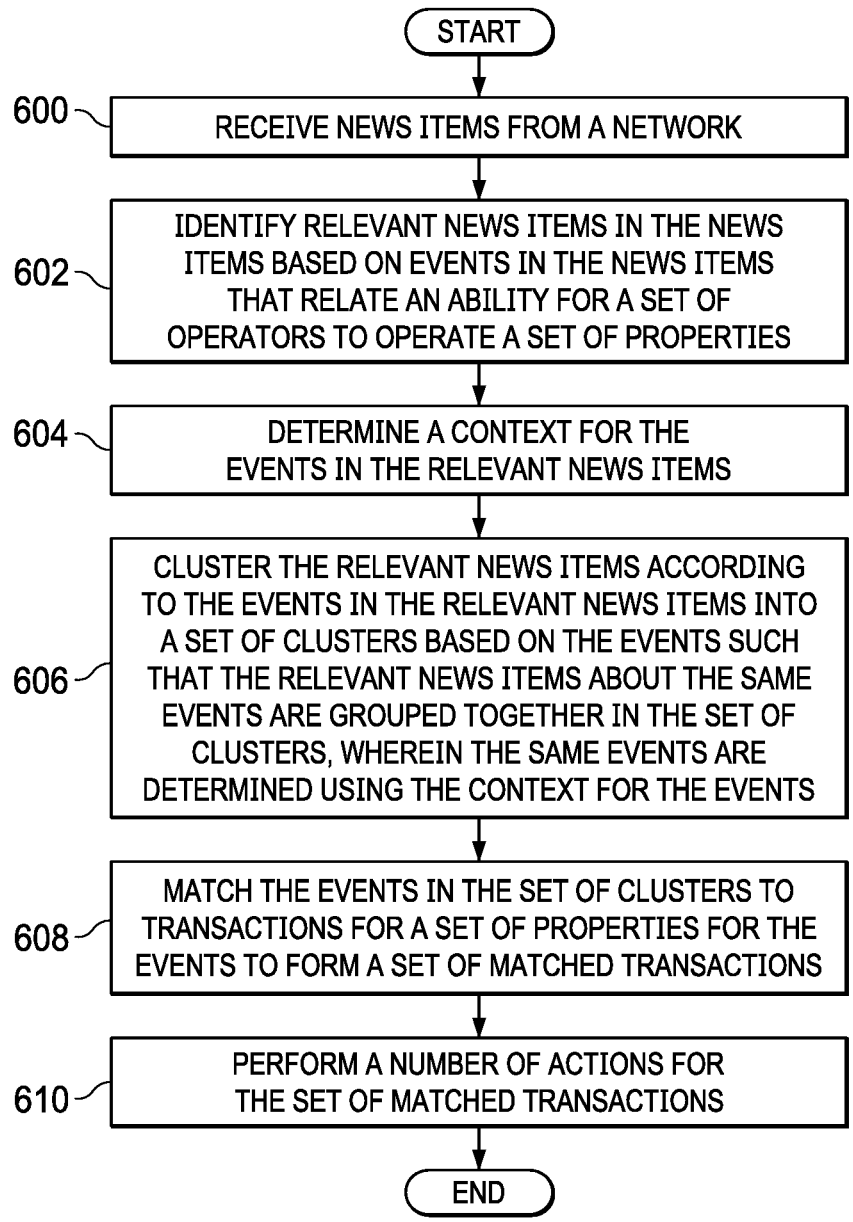
FIG. 6 is a flowchart of a process for processing news items in accordance with an illustrative embodiment.

Turning next to FIG. 6, a flowchart of a process for processing news items is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in news information processor 208 in computer system 206 in FIG. 2.

The process begins by receiving news items from a network (step 600). In this illustrative example, the news items can be received from a subscription to a set of sources on the network, wherein the subscription is based on topics of interest. In other illustrative examples, queries or crawlers can be used to search for the news items on websites or other sources.

The process identifies relevant news items in the news items based on events in the news items that relate an ability for a set of operators to operate a set of properties (step 602). In this illustrative example, an operator can be a tenant, an owner of a property, or some other entity that operates the property.

The process determines a context for the events in the relevant news items (step 604). The process clusters the relevant news items according to the events in the relevant news items into a set of clusters based on the events such that the relevant news items about the same events are grouped together in the set of clusters, wherein the same events are determined using the context for the events (step 606).

The process matches the events in the set of clusters to transactions for a set of properties for the events to form a set of matched transactions (step 608). The process performs a number of actions for the set of matched transactions (step 610). The process terminates thereafter.

Figure 7:
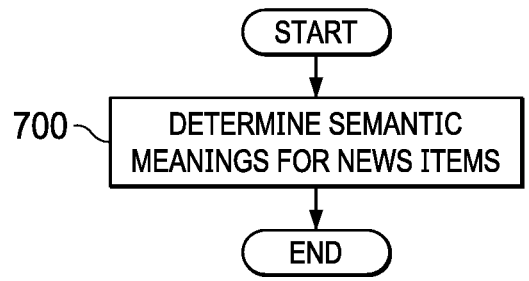
FIG. 7 is another flowchart of a process for processing news items in accordance with an illustrative embodiment.

Turning next to FIG. 7, another flowchart of a process for processing news items is depicted in accordance with an illustrative embodiment. In this figure, an additional optional step can be used to identify additional information from news items. This additional step can be used in at least one of determining relevant news items or clustering relevant news items.

The process determines semantic meanings for news items (step 700). The process terminates thereafter. In step 700, the semantic meanings can be determined using at least one of natural language processing or an artificial intelligence system.

Figure 8:
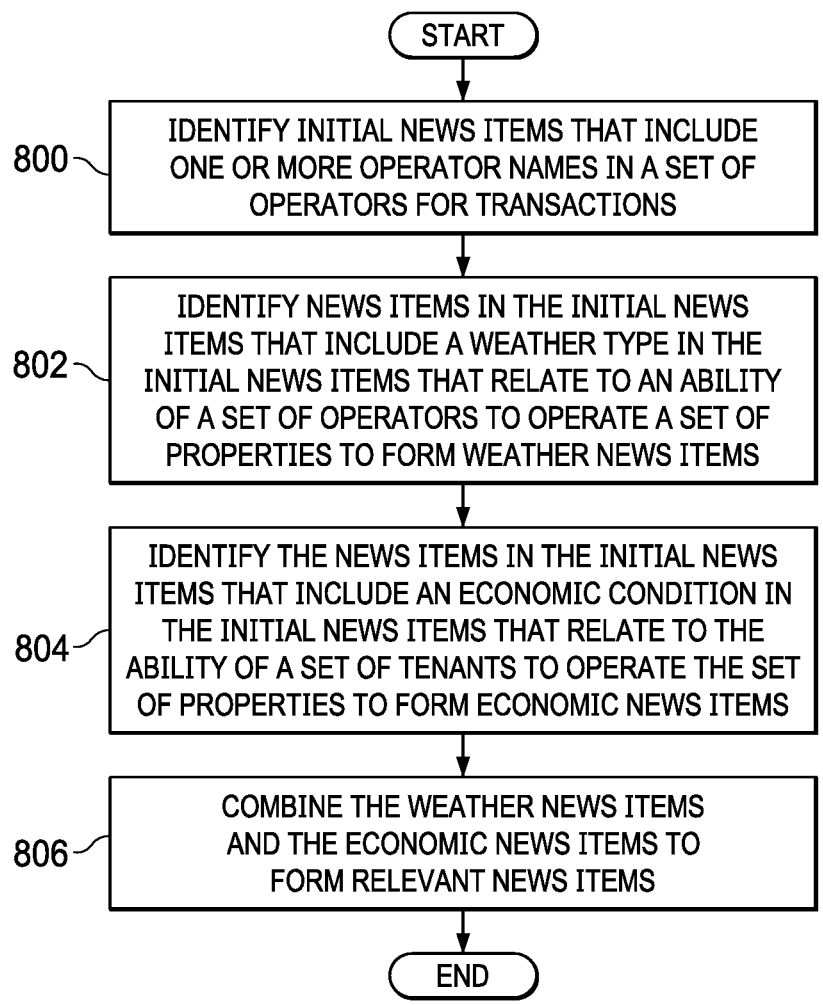
FIG. 8 is a flowchart of a process for identifying relevant news items in accordance with an illustrative embodiment.

With reference now to FIG. 8, a flowchart of a process for identifying relevant news items is depicted in accordance with an illustrative embodiment. The process illustrated in FIG. 8 is an example one manner in which step 602 in FIG. 6 can be implemented.

The process begins by identifying initial news items that include one or more operator names in a set of operators for transactions (step 800). These initial news items are filtered again to identify relevant news items as described below.

The process identifies news items in the initial news items that include a weather type in the initial news items that relate to an ability of a set of operators to operate a set of properties to form weather news items (step 802). The process identifies the news items in the initial news items that include an economic condition in the initial news items that relate to the ability of a set of tenants to operate the set of properties to form economic news items (step 804).

The process combines the weather news items and the economic news items to form relevant news items (step 806). The process terminates thereafter.

Figure 9:
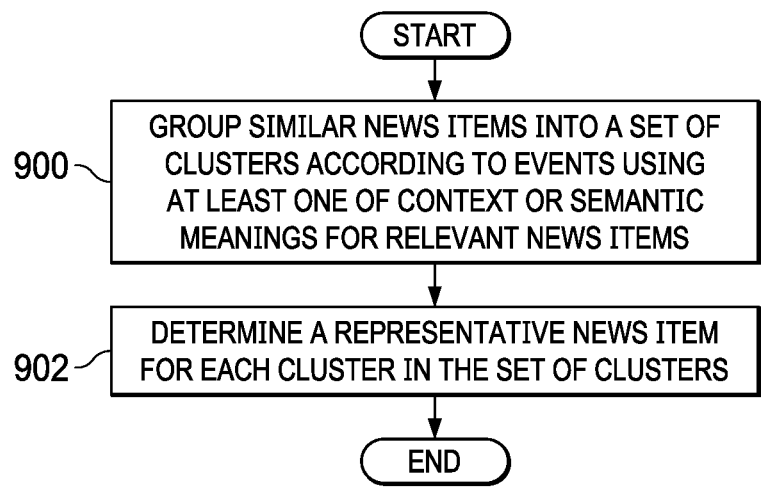
FIG. 9 is a flowchart of a process for clustering news items in accordance with an illustrative embodiment.

Turning to FIG. 9, a flowchart of a process for clustering news items is depicted in accordance with an illustrative embodiment. The process illustrated in FIG. 9 is an example one manner in which step 606 in FIG. 6 can be implemented.

The process groups similar news items into a set of clusters according to events using at least one of context or semantic meanings for relevant news items (step 900). In step 900, the similar news items having at least one of the context or the semantic meanings for a same event in the events are in a same cluster in the set of clusters.

The process determines a representative news item for each cluster in the set of clusters (step 902). The process terminates thereafter.

Figure 10:
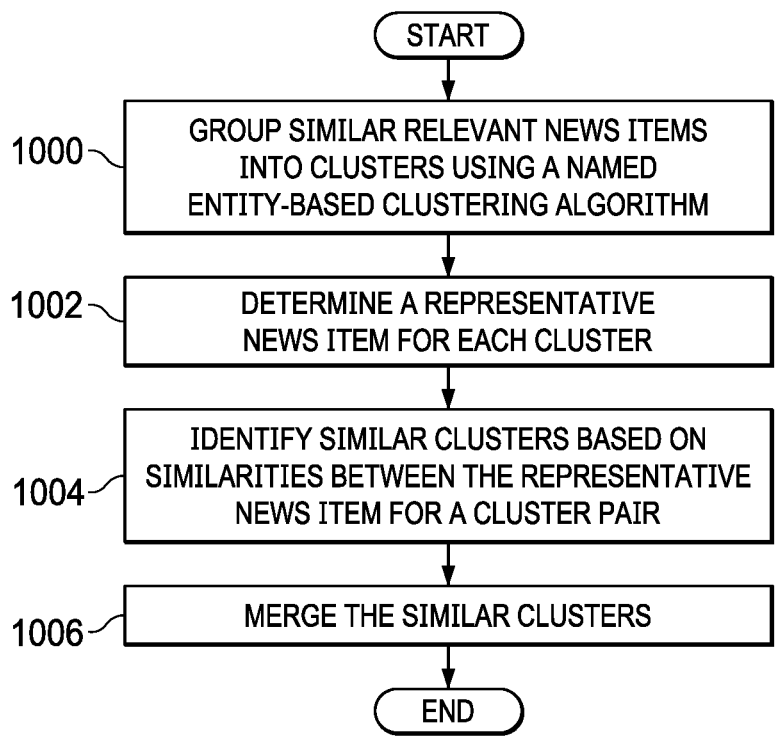
FIG. 10 is a flowchart illustrating a process for clustering relevant news items using a deep learning clustering algorithm in accordance with an illustrative embodiment.

With reference now to FIG. 10, a flowchart illustrating a process for clustering relevant news items using a deep learning clustering algorithm is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in news information processor 208 in computer system 206 in FIG. 2. This flowchart is an example of another manner in which step 606 in FIG. 6 can be implemented.

The process begins by grouping similar relevant news items into clusters using a named entity-based clustering algorithm (step 1000). In one illustrative example, the relevant news items are clustered iteratively in chronological order within a news cycle.

The process determines a representative news item for each cluster (step 1002). In one illustrative example, a pairwise cosine similarity is determined between a lower dimensional representation of the relevant news item and a centroid of each existing news cluster. In this example, a deep contextualized word representation model can be used to compute the lower dimensional representation for each representative news article. In this illustrative example, ELMo is an example of a deep contextualized word representation model that can be used. ELMo is a deep contextualized word representation that models both (1) complex characteristics of word use, such as syntax and semantics, and (2) how these uses vary across linguistic contexts such as to model polysemy.

A closest cluster is the cluster having a greatest pairwise cosine similarity. In this example, a pairwise cosine similarity is a measure of similarity between two non-zero vectors of an inner product space.

Next, the process identifies similar clusters based on similarities between the representative news item for a cluster pair (step 1004). The process merges the similar clusters (step 1006), with the process terminating thereafter.

Figure 11:
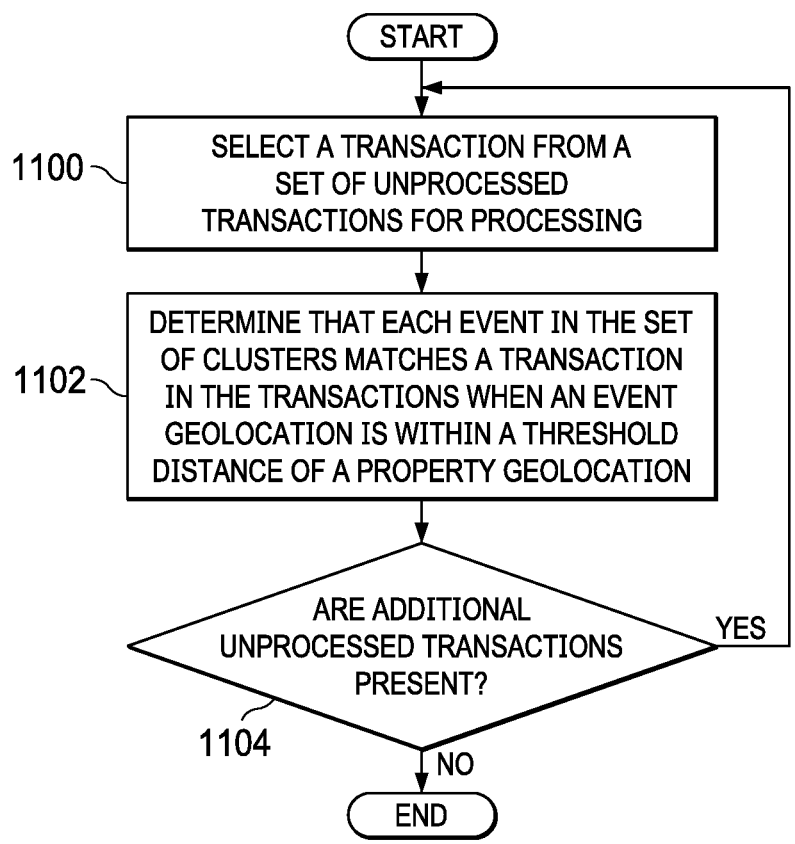
FIG. 11 is a flowchart of a process for matching events to transactions in accordance with an illustrative embodiment.

Turning next to FIG. 11, a flowchart of a process for matching events to transactions is depicted in accordance with an illustrative embodiment. The process illustrated in FIG. 11 is an example of one manner in which step 608 in FIG. 6 can be implemented.

The process selects a transaction from a set of unprocessed transactions for processing (step 1100). The process determines that each event in a set of clusters matches the transaction in the transactions when an event geolocation is within a threshold distance of a property geolocation (step 1102). In step 1102, more than one event may match the transaction.

A determination is made as to whether additional unprocessed transactions are present (step 1104). If additional unprocessed transactions are present, the process returns to step 1100. Otherwise, the process terminates.

Figure 12:
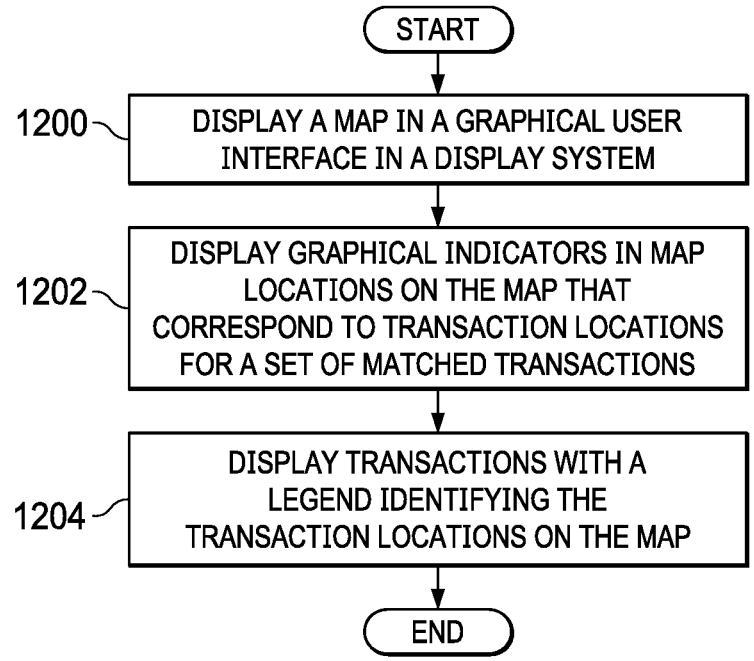
FIG. 12 is a flowchart of a process for performing an action in accordance with an illustrative embodiment.

In FIG. 12, a flowchart of a process for performing an action is depicted in accordance with an illustrative embodiment. The process in FIG. 12 is an example of one manner in which step 610 in FIG. 6 can be implemented.

The process begins by displaying a map in a graphical user interface in a display system (step 1200). The process displays graphical indicators in map locations on the map that correspond to transaction locations for a set of matched transactions (step 1202). The process displays transactions with a legend identifying the transaction locations on the map (step 1204). The process terminates thereafter.

Figure 13:
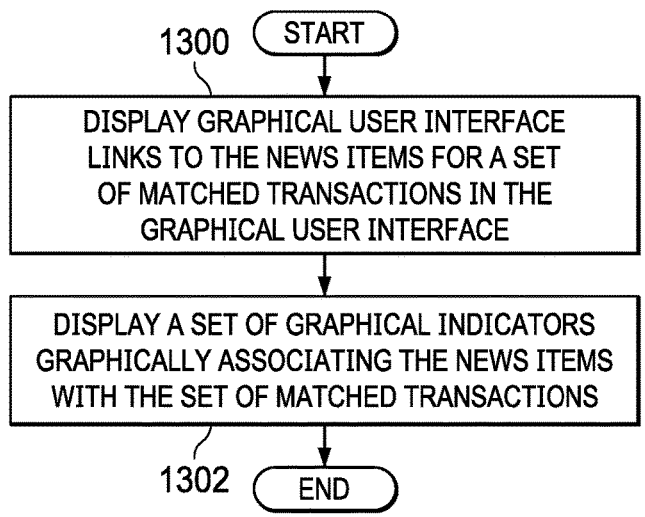
FIG. 13 is another flowchart of a process for performing an action in accordance with an illustrative embodiment.

Referring now to FIG. 13, another flowchart of a process for performing an action is depicted in accordance with an illustrative embodiment. The process in FIG. 13 is additional steps that can be performed with the process depicted in the flowchart in FIG. 12.

The process displays graphical user interface links to news items for a set of matched transactions in the graphical user interface (step 1300). The process displays a set of graphical indicators graphically associating the news items with the set of matched transactions (step 1302), with the process terminating thereafter.

Figure 14:
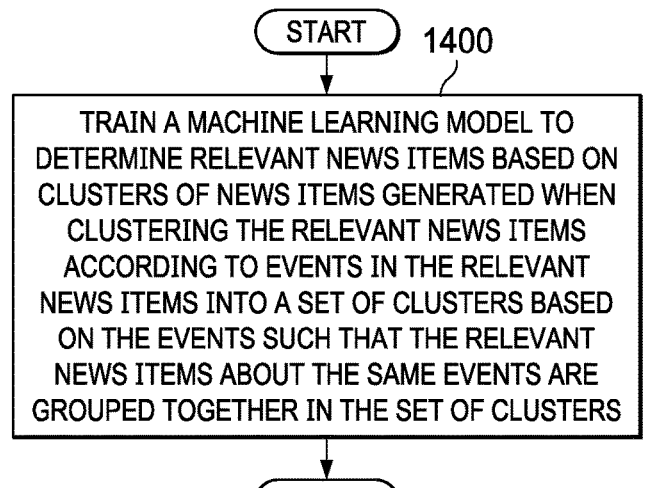
FIG. 14 is a flowchart of a process for training a machine learning model in accordance with an illustrative embodiment.

Turning next to FIG. 14, a flowchart of a process for training a machine learning model is depicted in accordance with an illustrative embodiment. The process in FIG. 14 can be implemented in hardware, software, or both. When implemented in software, the process can take the form of program code that is run by one or more processor units located in one or more hardware devices in one or more computer systems. For example, the process can be implemented in news information processor 208 in computer system 206 to train machine learning model 256 in FIG. 2.

The process trains a machine learning model to determine relevant news items based on clusters of news items generated when clustering the relevant news items according to events in the relevant news items into a set of clusters based on the events such that the relevant news items about same events are grouped together in the set of clusters (step 1400). The process terminates thereafter.

Figure 15:
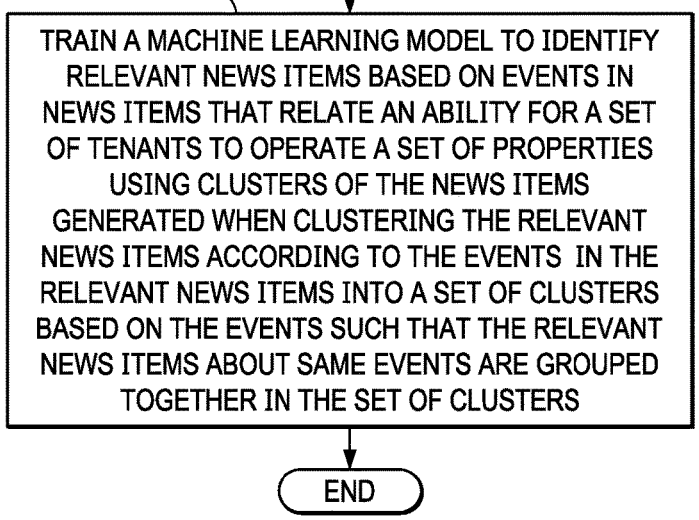
FIG. 15 is another flowchart of a process for training a machine learning model in accordance with an illustrative embodiment.

With reference now next to FIG. 15, another flowchart of a process for training a machine learning model is depicted in accordance with an illustrative embodiment. The process in FIG. 15 can be implemented in hardware, software, or both. When implemented in software, the process can take the form of program code that is run by one of more processor units located in one or more hardware devices in one or more computer systems. For example, the process can be implemented in news information processor 208 in computer system 206 to train machine learning model 256 in FIG. 2.

The process trains a machine learning model to identify relevant news items based on events in news items that relate an ability for a set of tenants to operate a set of properties using clusters of the news items generated when clustering the relevant news items according to the events in the relevant news items into a set of clusters based on the events such that the relevant news items about same events are grouped together in the set of clusters (step 1500). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
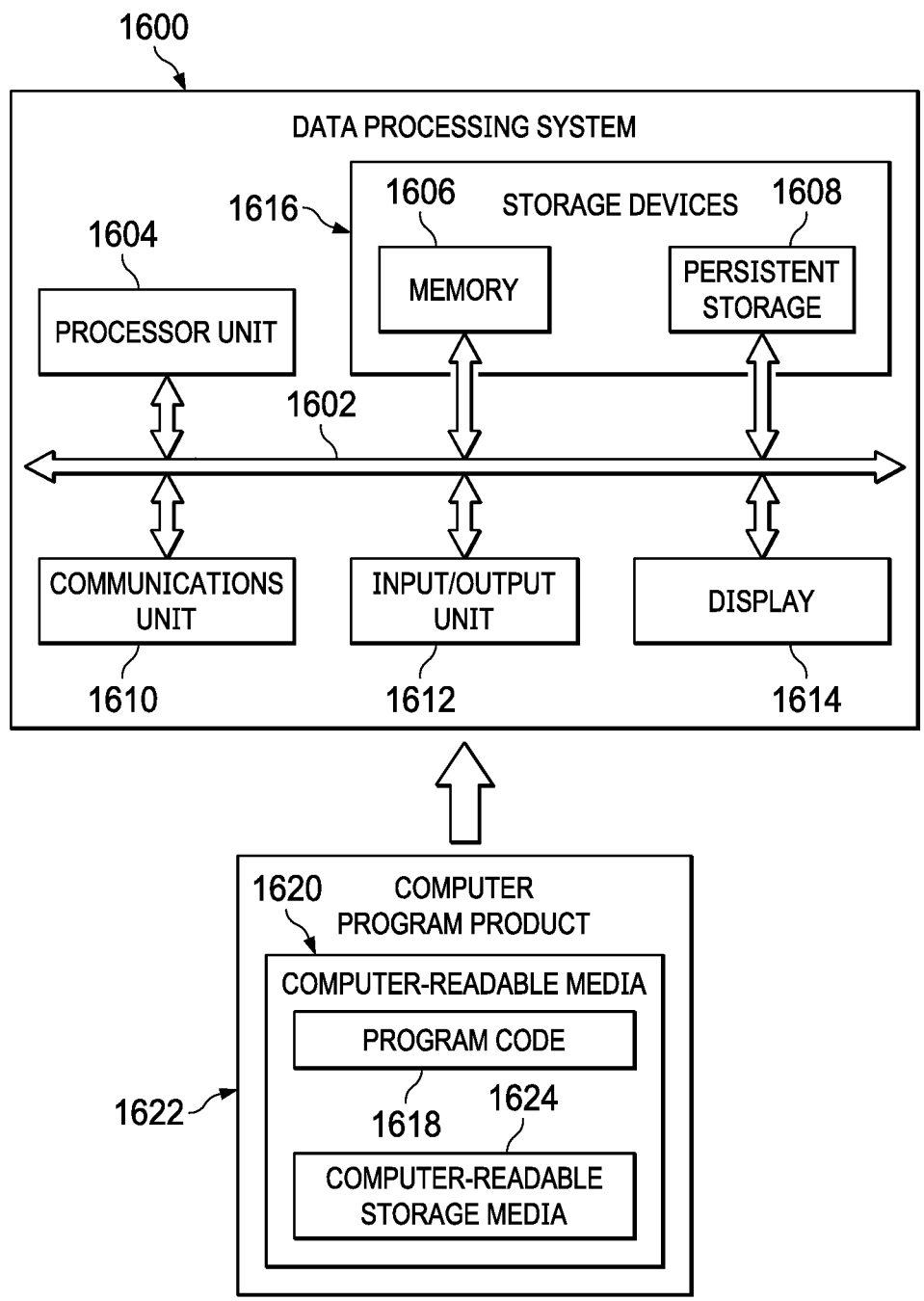
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement server computer 104, server computer 106, client devices 110, in FIG. 1. Data processing system 1600 can also be used to implement computer system 206. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program code, computer usable program code, or computer-readable program code that can be read and executed by a processor in processor unit 1604. The program code in the different embodiments can be embodied on different physical or computer-readable storage media, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable media 1620 is computer-readable storage media 1624.

In these illustrative examples, computer-readable storage media 1624 is a physical or tangible storage device used to store program code 1618 rather than a media that propagates or transmits program code 1618. Computer-readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1618 can be transferred to data processing system 1600 using a computer-readable signal media. The computer-readable signal media can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program code 1618 can be located in computer-readable media 1620 in the form of a single storage device or system. In another example, program code 1618 can be located in computer-readable media 1620 that is distributed in multiple data processing systems. In other words, some instructions in program code 1618 can be located in one data processing system while other instructions in program code 1618 can be located in one data processing system. For example, a portion of program code 1618 can be located in computer-readable media 1620 in a server computer while another portion of program code 1618 can be located in computer-readable media 1620 located in a set of client computers.

The different components illustrated for data processing system 1600 are not meant to provide architectural limitations to the manner in which different embodiments can be implemented. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program code 1618.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 1606, or portions thereof, may be incorporated in processor unit 1604 in some illustrative examples.

Thus, the illustrative embodiments provide a method, apparatus, and system for processing news items. In one illustrative example, an information processing system comprises a computer system and a news information processor in the computer system. The news information processor is configured to receive news items from a network. The news information processor is configured to identify relevant news items in the news items based on events in the news items that relate an ability of a set of properties to generate income. In one illustrative example, the ability of a set of properties to generate income involves the ability of a set of operators to operate the set of properties and pay rent for the set of properties. In another illustrative example, the property may be a natural resource property. The events may affect the ability of the set of operators to obtain natural resources from this property.

The news information processor is configured to determine a context for the events in the relevant news items. The news information processor is configured to cluster the relevant news items according to the events in the relevant news items into a set of clusters based on the events such that the relevant news items about same events are grouped together in the set of clusters, wherein the same events are determined using the context for the events. The news information processor is configured to match the events to transactions for the set of properties for the events in the set of clusters to form a set of matched transactions. The news information processor is configured to perform a number of actions for the set of matched transactions.

In the illustrative examples, time and effort needed by a user to review articles for events of interest and determine whether the events of interest relate to properties subject to transactions can be avoided by the user through automated processing of news items by a news information processor. Further, with the use of a news information processor that includes or accesses an artificial intelligence system, more accurate and detailed analysis of news items can be made to identify events of interest that affect properties subject to transactions.

Further, a graphical user interface is a graphical tool that provides a visualization of information in a manner that is more than merely listing articles and transactions. These different features can provide a user an ability to easily and quickly visualize news about events that may affect the ability of an operator to operate the property that is subject to a transaction.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An information processing system comprising:
   a computer system; and
   a news information processor in the computer system, wherein the news information processor is configured to:
   receive news items from a network;
   identify relevant news items in the news items based on events in the news items that relate an ability for a set of operators to operate a set of properties;
   determine a context for the events in the relevant news items;
   cluster the relevant news items according to the events in the relevant news items into a set of clusters based on the events such that the relevant news items about same events are grouped together in the set of clusters, wherein the same events are determined using the context for the events, wherein in clustering the relevant news items, the news information processor is configured to group similar news items into the set of clusters according to the events using the context and semantic meanings for the relevant news items, wherein similar news items having the context and the semantic meanings for a same event in the events are in a same cluster in the set of clusters;
   match the events to transactions for the set of properties for the events in the set of clusters to form a set of matched transactions; and
   perform a number of actions for the set of matched transactions, wherein the number of actions comprises at least one of: determining a credit rating for a set of entities for the set of matched transactions, or determining a rating for a commercial mortgage-backed security.

2. The information processing system of claim 1, wherein the news information processor is configured to:
   store the news items in a news database.

3. The information processing system of claim 1, wherein the news items are received from a subscription to a set of sources on the network, wherein the subscription is based on topics of interest.

4. The information processing system of claim 1, wherein in identifying the relevant news items, the news information processor is configured to:
   identify the relevant news items using relevance filtering to remove the news items that do not relate the ability for the set of operators to operate the set of properties.

5. The information processing system of claim 4, wherein the relevance filtering removes the news items that do not include at least one of a operators name for the set of operators, a weather type in the news items that relate to the ability of the set of operators to operate the set of properties, or an economic condition in the news items that relates to the ability of the set of operators to operate the set of properties.

6. The information processing system of claim 1, wherein in determining the context, the news information processor is configured to:
   determine at least one of an importance of a source of a news item or a location of an event.

7. The information processing system of claim 1, wherein in clustering the relevant news items, the news information processor is further configured to:
   determine a representative news item for each cluster in the set of clusters.

8. The information processing system of claim 1, wherein in matching the events in the set of clusters to the transactions, the news information processor is configured to:
   determine that an event in the set of clusters matches a transaction in the transactions when an event geolocation is within a threshold distance of a property geolocation.

9. The information processing system of claim 1, wherein in performing the number of actions for the set of matched transactions, the number of actions comprises at least one of: sending an email message with news items identifications of the set of matched transactions, or displaying the set of matched transactions on a graphical user interface in a display system.

10. The information processing system of claim 1, wherein in performing the number of actions for the set of matched transactions, the news information processor is configured to:
   display a map in a graphical user interface in a display system; and
   display graphical indicators in map locations on the map that correspond to transaction locations for the set of matched transactions.

11. The information processing system of claim 10, wherein in performing the number of actions for the set of matched transactions, the news information processor is further configured to:
   display links to the news items for the set of matched transactions in the graphical user interface; and
   display a set of graphical indicators graphically associating the news items with the set of matched transactions.

12. The information processing system of claim 1, wherein at least one of:
   receiving the news items from the network; identifying the relevant news items in the news items based on the events in the news items that relate the ability for the set of operators to operate the set of properties;
   determining the context for the events in the relevant news items;
   clustering the relevant news items according to the events in the relevant news items into the set of clusters based on the events such that the relevant news items about the same events are grouped together in the set of clusters, wherein the same events are determined using the context for the events;
   matching the events in the set of clusters to the transactions for the set of properties for the events to form the set of matched transactions; or
   performing the number of actions for the set of matched transactions,
   is performed using an artificial intelligence system.

13. The information processing system of claim 1, wherein the news information processor is configured to:
   train a machine learning model to determine the relevant news items based on clusters of the news items generated when clustering the relevant news items according to the events in the relevant news items into the set of clusters based on the events such that the relevant news items about the same events are grouped together in the set of clusters, wherein the same events are determined using the context for the events.

14. The information processing system of claim 1, the news information processor is configured to:
   train a machine learning model to identifying the relevant news items based on the events in the news items that relate the ability for the set of operators to operate the set of properties using clusters of the news items generated when clustering the relevant news items according to the events in the relevant news items into the set of clusters based on the events such that the relevant news items about the same events are grouped together in the set of clusters, wherein the same events are determined using the context for the events.

15. The information processing system of claim 1, wherein the transactions are selected from one of a commercial mortgage-backed security, a bond, a loan, a mortgage, or an investment product.

16. The information processing system of claim 1, wherein the news items are selected from at least one of a news article, a written news report, a video news story, a social media post, or an audio news story.

17. The information processing system of claim 1, wherein the set of properties is selected from at least one of a commercial property, a residential property, an industrial property, or a natural resource producing property.

18. The information processing system of claim 1, wherein events in news items that relate the ability for the set of operators to operate the set of properties are selected from at least one of a store closing, a bankruptcy, a weather condition, an earthquake, a hurricane, a flood, a wildfire, an economic condition, unemployment, or an industry crisis.

19. The information processing system of claim 1, wherein in performing the number of actions for the set of matched transactions, the number of actions comprises determining a rating.

20. An information processing system comprising:
   a computer system; and
   a news information processor in the computer system, wherein the news information processor is configured to:
   receive news items from a network;
   identify relevant news items in the news items based on events in the news items that relate an ability a set of properties to generate income;
   determine a context for the events in the relevant news items;
   cluster the relevant news items according to the events in the relevant news items into a set of clusters based on the events such that the relevant news items about same events are grouped together in the set of clusters, wherein the same events are determined using the context for the events, wherein in clustering the relevant news items, the news information processor is configured to group similar news items into the set of clusters according to the events using the context and semantic meanings for the relevant news items, wherein similar news items having the context and the semantic meanings for a same event in the events are in a same cluster in the set of clusters;
   match the events to transactions for the set of properties for the events in the set of clusters to form a set of matched transactions; and perform a number of actions for the set of matched transactions, wherein the number of actions comprises at least one of: determining a credit rating for a set of entities for the set of matched transactions, or determining a rating for a commercial mortgage-backed security.

21. An information processing system comprising:
a computer system;
a news ingestion layer in the computer system, wherein the news ingestion layer is configured to receive news items from a network;
a relevance layer in the computer system, wherein the relevance layer is configured to identify relevant news items in the news items based on events in the news items that relate an ability for a set of operators to operate a set of properties;
a contextualization layer in the computer system, wherein the contextualization layer is configured to determine a context for the events in the relevant news items;
a clustering layer in the computer system, wherein the clustering layer is configured to cluster the relevant news items according to the events in the relevant news items into a set of clusters based on the events such that the relevant news items about same events are grouped together in the set of clusters and wherein the same events are determined using the context for the events, wherein the clustering layer is configured to group similar news items into the set of clusters according to the events using the context and semantic meanings for the relevant news items, wherein similar news items having the context and the semantic meanings for a same event in the events are in a same cluster in the set of clusters;
a transaction matching layer in the computer system, wherein the transaction matching layer is configured to match the events in the set of clusters to transactions for the set of properties for the events to form a set of matched transactions; and
an application layer in the computer system, wherein the application layer is configured to perform a number of actions for the set of matched transactions, wherein the number of actions comprises at least one of: determining a credit rating for a set of entities for the set of matched transactions; or determining a rating for a commercial mortgage-backed security.

22. The information processing system of claim 21, wherein in identifying the relevant news items, the relevance layer is configured to:
identify the relevant news items using relevance filtering to remove the news items that do not relate the ability for the set of operators to operate the set of properties.

23. The information processing system of claim 22, wherein the relevance filtering removes the news items that do not include at least one of a operators name for the set of operators, a weather type in the news items that relate to the ability of the set of operators to operate the set of properties, or an economic condition in the news items that relates to the ability of the set of operators to operate the set of properties.

24. The information processing system of claim 21, wherein in determining the context, the contextualization layer is configured to:
determine at least one of an importance of a source of a news item or a location of an event.

25. The information processing system of claim 21, wherein in clustering the relevant news items, the clustering layer is further configured to:
determine a representative news item for each cluster in the set of clusters.

26. The information processing system of claim 21, wherein in matching the events in the set of clusters to the transactions, the transaction matching layer is configured to:
determine that an event in the set of clusters matches a transaction in the transactions when an event geolocation is within a threshold distance of a property geolocation.

27. The information processing system of claim 21, wherein the number of actions comprises at least one of: sending an email message with news items identifications of the set of matched transactions, or displaying the set of matched transactions on a graphical user interface in a display system.

28. The information processing system of claim 21, wherein in performing the number of actions for the set of matched transactions, the application layer is configured to:
display a map in a graphical user interface in a display system; and
display graphical indicators in map locations on the map that correspond to transaction locations for the set of matched transactions.

29. The information processing system of claim 28, wherein in performing the number of actions for the set of matched transactions, the application layer is further configured to:
display links to the news items for the set of matched transactions in the graphical user interface; and
display a set of graphical indicators graphically associating the news items with the set of matched transactions.

30. The information processing system of claim 21, wherein the computer system is configured to:
train a machine learning model to determine the relevant news items based on clusters of the news items generated when clustering the relevant news items according to the events in the relevant news items into the set of clusters based on the events such that the relevant news items about the same events are grouped together in the set of clusters, wherein the same events are determined using the context for the events.

31. The information processing system of claim 21, the computer system is configured to:
train a machine learning model to identify the relevant news items based on the events in the news items that relate the ability for the set of operators to operate the set of properties using clusters of the news items generated when clustering the relevant news items according to the events in the relevant news items into the set of clusters based on the events such that the relevant news items about the same events are grouped together in the set of clusters.

32. The information processing system of claim 21, wherein the transactions are selected from one of a commercial mortgage-backed security, a bond, a loan, a mortgage, or an investment product.

33. The information processing system of claim 21, wherein the news items are selected from at least one of a news article, a written news report, a video news story, a social media post, or an audio news story.

34. The information processing system of claim 21, wherein the set of properties is selected from at least one of a commercial property, a residential property, an industrial property, or a natural resource producing property.

35. The information processing system of claim 21, wherein the number of actions comprises determining a rating.

36. A method for processing news items, the method comprising:
  receiving, by a computer system, news items from a network;
  identifying, by the computer system, relevant news items in the news items based on events in the news items that relate an ability for a set of operators to operate a set of properties;
  determining, by the computer system, a context for the events in the relevant news items;
  clustering, by the computer system, the relevant news items according to the events in the relevant news items into a set of clusters based on the events such that the relevant news items about the same events are grouped together in the set of clusters, wherein the same events are determined using the context for the events, wherein clustering, by the computer system, comprises grouping similar news items into the set of clusters according to the events using the context and semantic meanings for the relevant news items, wherein similar news items having the context and the semantic meanings for a same event in the events are in a same cluster in the set of clusters;
  matching, by the computer system, the events in the set of clusters to transactions for the set of properties for the events to form a set of matched transactions; and
  performing, by the computer system, a number of actions for the set of matched transactions, wherein the number of actions comprises at least one of: determining a credit rating for a set of entities for the set of matched transactions, or determining a rating for a commercial mortgage-backed security.

37. The method of claim 36 further comprising:
  storing, by the computer system, the news items in a news database.

38. The method of claim 36, wherein the news items are received from a subscription to a set of sources on the network, wherein the subscription is based on topics of interest.

39. The method of claim 36, wherein identifying, by the computer system, the relevant news items in the news items based on the events in the news items that relate the ability for the set of operators to operate the set of properties comprises:
  identifying the news items mentioning using relevance filtering to remove the news items that do not relate the ability for the set of operators to operate the set of properties.

40. The method of claim 39, wherein the relevance filtering removes the news items that do not include at least one of a operators name for the set of operators, a weather type in the news items that relate to the ability of the set of operators to operate the set of properties, or an economic condition in the news items that relates to the ability of the set of operators to operate the set of properties.

41. The method of claim 36, wherein determining, by the computer system, the context for the events in the relevant news items comprises:
  determining at least one of an importance of a source of a news item or a location of an event.

42. The method of claim 36, wherein clustering, by the computer system, the relevant news items according to the events in the relevant news items into the set of clusters based on the events such that the relevant news items about the same events are grouped together in the set of clusters further, wherein the same events are determined using the context for the events comprises:
  determining a representative news item for each cluster in the set of clusters.

43. The method of claim 36, wherein matching, by the computer system, the events in the set of clusters to the transactions for the set of properties for the events to form the set of matched transactions comprises:
  determining that an event in the set of clusters matches a transaction in the transactions when an event geolocation is within a threshold distance of a property geolocation.

44. The method of claim 36, wherein the number of actions comprises at least one of: sending an email message with news items identifications of the set of matched transactions, or displaying the set of matched transactions on a graphical user interface in a display system.

45. The method of claim 36, wherein performing, by the computer system, the number of actions for the set of matched transactions comprises:
  displaying a map in a graphical user interface in a display system; and
  displaying graphical indicators in map locations on the map that correspond to transaction locations for the set of matched transactions.

46. The method of claim 45, wherein performing, by the computer system, the number of actions for the set of matched transactions further comprises:
  displaying graphical user interface links to the news items for the set of matched transactions in the graphical user interface; and
  displaying a set of graphical indicators graphically associating the news items with the set of matched transactions.

47. The method of claim 36, wherein at least one of:
  receiving the news items from the network; identifying the relevant news items in the news items based on the events in the news items that relate the ability for the set of operators to operate the set of properties;
  determining the context for the events in the relevant news items;
  clustering the relevant news items according to the events in the relevant news items into the set of clusters based on the events such that the relevant news items about the same events are grouped together in the set of clusters, wherein the same events are determined using the context for the events;
  matching the events to the transactions for the set of properties for the events to form the set of matched transactions; or
  performing the number of actions for the set of matched transactions,
  is performed using an artificial intelligence system is performed using the artificial intelligence system.

48. The method of claim 36 further comprising:
  training, by the computer system, a machine learning model to determine the relevant news items based on clusters of the news items generated when clustering the relevant news items according to the events in the relevant news items into the set of clusters based on the events such that the relevant news items about the same events are grouped together in the set of clusters.

49. The method of claim 36 further comprising:
  training, by the computer system, a machine learning model to identify the relevant news items based on the events in the news items that relate the ability for the set of operators to operate the set of properties using the clusters of the news items generated when clustering the relevant news items according to the events in the relevant news items into the set of clusters based on the events such that the relevant news items about the same events are grouped together in the set of clusters.

50. The method of claim 36, wherein the transactions are selected from one of a commercial mortgage-backed security, a bond, a loan, a mortgage, or an investment product.

51. The method of claim 36, wherein the news items are selected from at least one of a news article, a written news report, a video news story, a social media post, or an audio news story.

52. The method of claim 36, wherein the set of properties is selected from at least one of a commercial property, a residential property, an industrial property, or a natural resource producing property.

53. The method of claim 36, wherein events in news items that relate the ability for the set of operators to operate the set of properties are selected from at least one of a store closing, a bankruptcy, a weather condition, an earthquake, a hurricane, a flood, a wildfire, an economic condition, unemployment, or an industry crisis.

54. The method of claim 36, wherein the number of actions comprises determining a rating.

55. A computer program product for processing news items, the computer program product comprising:
 a computer-readable storage media;
 first program code, stored on the computer-readable storage media, executable by a computer system to cause the computer system to receive news items from a network;
 second program code, stored on the computer-readable storage media, executable by the computer system to cause the computer system to identify relevant news items in the news items based on events in the news items that relate an ability for a set of operators to operate a set of properties;
 third program code, stored on the computer-readable storage media, executable by the computer system to cause the computer system to determine a context for the events in the relevant news items;
 fourth program code, stored on the computer-readable storage media, executable by the computer system to cause the computer system to cluster the relevant news items according to the events in the relevant news items into a set of clusters based on the events such that relevant news items about the same events are grouped together in the set of clusters, wherein the same events are determined using the context for the events, wherein in clustering the relevant news items, executing the fourth program code causes the computer system to group similar news items into the set of clusters according to the events using the context and semantic meanings for the relevant news items, wherein similar news items having the context and the semantic meanings for a same event in the events are in a same cluster in the set of clusters;
 fifth program code, stored on the computer-readable storage media, executable by the computer system to cause the computer system to match the events in the set of clusters to transactions for the set of properties for the events to form a set of matched transactions; and
 sixth program code, stored on the computer-readable storage media, executable by the computer system to cause the computer system to perform a number of actions for the set of matched transactions, wherein the number of actions comprises at least one of: determining a credit rating for a set of entities for the set of matched transactions, or determining a rating for a commercial mortgage-backed security.

56. The computer program product of claim 55, wherein the sixth program code comprises:
 program code, stored on the computer-readable storage media, executable by the computer system to cause the computer system to display a map in a graphical user interface in a display system; and
 program code, stored on the computer-readable storage media, executable by the computer system to cause the computer system to display graphical indicators in map locations on the map that correspond to transaction locations for the set of matched transactions.

57. The computer program product of claim 56, wherein the sixth program code further comprises:
 program code, stored on the computer-readable storage media, executable by the computer system to cause the computer system to display links to the news items for the set of matched transactions in the graphical user interface; and
 program code, stored on the computer-readable storage media, executable by the computer system to cause the computer system to display a set of graphical indicators graphically associating the news items with the set of matched transactions.

\* \* \* \* \*